US007633528B2

(12) United States Patent
Fukushima et al.

(10) Patent No.: US 7,633,528 B2
(45) Date of Patent: Dec. 15, 2009

(54) MULTI-VIEWPOINT IMAGE GENERATION APPARATUS, MULTI-VIEWPOINT IMAGE GENERATION METHOD, AND MULTI-VIEWPOINT IMAGE GENERATION PROGRAM

(75) Inventors: Rieko Fukushima, Tokyo (JP); Tatsuo Saishu, Tokyo (JP); Shunichi Numazaki, Kanagawa (JP); Yuzo Hirayama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 638 days.

(21) Appl. No.: 11/525,817

(22) Filed: Sep. 25, 2006

(65) Prior Publication Data

US 2007/0121182 A1 May 31, 2007

(30) Foreign Application Priority Data

Sep. 29, 2005 (JP) .......................... P2005-285437

(51) Int. Cl.
*H04N 5/232* (2006.01)
*H04N 5/222* (2006.01)
(52) U.S. Cl. .............................. 348/211.8; 348/207.99; 348/211.11; 348/333.01; 348/335; 345/619; 345/625
(58) Field of Classification Search .................. None
See application file for complete search history.

(56) References Cited

U.S. PATENT DOCUMENTS

| 6,989,829 | B2 * | 1/2006 | Haga et al. ................ 345/418 |
| 7,538,774 | B2 * | 5/2009 | Kunita et al. .............. 345/589 |
| 2004/0150583 | A1 | 8/2004 | Fukushima et al. |
| 2005/0073585 | A1 * | 4/2005 | Ettinger et al. ............ 348/155 |

FOREIGN PATENT DOCUMENTS

| JP | 6-34343 | 2/1994 |
| JP | 2004-212666 | 7/2004 |

OTHER PUBLICATIONS

Saishu, et al., "53.3: Distortion Control in a One-Dimensional Integral Imaging Autostereoscopic Display System with Parallel Optical Beam Groups", SID 04 Digest, pp. 1438-1441, (2004).
Hoshino, et al., "Analysis of resolution limitation of integral photography", J. Opt. Soc. Am. A, vol. 15, No. 8, pp. 2059-2065, (1998).
Fukushima, et al., "Method for Producing Multi-Viewpoint Image for Three-Dimensional Image Display and Program Therefor", U.S. Appl. No. 10/581,363, filed Jun. 2, 2006.
Fukushima, et al., "Three-Dimensional Image Display Apparatus, Method of Distributing Elemental Images to the Display Apparatus, and Method of Displaying Three-Dimensional Image on the Display Apparatus", U.S. Appl. No. 10/744,045, filed Dec. 24, 2003.

* cited by examiner

*Primary Examiner*—Ngoc-Yen T Vu
(74) *Attorney, Agent, or Firm*—Finnegan, Henderson, Farabow, Garrett & Dunner, L.L.P.

(57) ABSTRACT

A multi-viewpoint image generation apparatus includes: a generation screen display unit that controls a two-dimensional image display device to display a two-dimensional image indicating an arrangement of the object in a multi-viewpoint image to be displayed on a the three-dimensional image display device; a modification command acquisition unit that acquires a modification command; a camera control unit that modifies a camera condition including a number of cameras corresponding to the multi-viewpoint image, a placement position of each of the cameras, a size of the projection plane of each of the cameras, a point of regard, and a projection method, based on the modification command acquired by the modification command acquisition unit; and a multi-viewpoint image generation unit that generates the multi-viewpoint image acquired by the cameras being configured according to the camera condition modified by the camera control unit.

30 Claims, 32 Drawing Sheets

FIG. 9

```
┌─────────────────────────────────────────┐
│         DISPLAY PARAMETERS              │
│                                         │
│    ☑  SELECT STANDARD DISPLAY           │
│                                         │
│    ┌──────────────────────────┬───┐     │
│    │    SELECTION MENU        │ ▼ │     │
│    └──────────────────────────┴───┘     │
│    ┌──────────────────────────────┐     │
│    │   READ CONFIGURATION FILE    │     │
│    └──────────────────────────────┘     │
│    ┌──────────────────────────────┐     │
│    │    SAVE CURRENT SETTINGS     │     │
│    └──────────────────────────────┘     │
│   ┌─ THREE-DIMENSIONAL ─────────────┐   │
│   │  IMAGE DISPLAY TYPE             │   │
│   │   ⦿  II        ○  Multi-View    │   │
│   └─────────────────────────────────┘   │
│                                         │
│   ┌─ EXIT PUPIL TYPE ───────────────┐   │
│   │  ┌──────────────────────┬───┐   │   │
│   │  │   SELECTION MENU     │ ▼ │   │   │
│   │  └──────────────────────┴───┘   │   │
│   │  FOCAL DISTANCE IN   ┌─────────┐│   │
│   │  TERMS OF AIR [mm]   │ NUMERIC ││   │
│   │                      │ VALUE   ││   │
│   │                      └─────────┘│   │
│   └─────────────────────────────────┘   │
│   ┌─ NUMBER OF PARALLAXES ──────────┐   │
│   │  NUMBER OF PARALLAXES ┌────────┐│   │
│   │  [PARALLAXES]         │NUMERIC ││   │
│   │                       │VALUE   ││   │
│   │                       └────────┘│   │
│   └─────────────────────────────────┘   │
│   ┌─ TWO-DIMENSIONAL IMAGE ─────────┐   │
│   │  DISPLAY DEVICE                 │   │
│   │   RESOLUTION x [pix] ┌────────┐ │   │
│   │                      │NUMERIC │ │   │
│   │                      │VALUE   │ │   │
│   │              y [pix] ┌────────┐ │   │
│   │                      │NUMERIC │ │   │
│   │                      │VALUE   │ │   │
│   │         SIZE  x [mm] ┌────────┐ │   │
│   │                      │NUMERIC │ │   │
│   │                      │VALUE   │ │   │
│   │               y [mm] ┌────────┐ │   │
│   │                      │NUMERIC │ │   │
│   │                      │VALUE   │ │   │
│   └─────────────────────────────────┘   │
│   ┌─ VIEWING ZONE SETTING CONDITION ┐   │
│   │  VIEWING DISTANCE [mm] ┌───────┐│   │
│   │                        │NUMERIC││   │
│   │                        │VALUE  ││   │
│   └─────────────────────────────────┘   │
│   ┌─ DISPLAY LIMITS ────────────────┐   │
│   │    NEAR SIDE [mm] ┌─────────────┐│  │
│   │                   │NUMERIC VALUE:││  │
│   │                   │DISPLAY ONLY ││   │
│   │    FAR SIDE [mm]  ┌─────────────┐│  │
│   │                   │NUMERIC VALUE:││  │
│   │                   │DISPLAY ONLY ││   │
│   └─────────────────────────────────┘   │
│   ┌─ NUMBER OF VIEWPOINTS ──────────┐   │
│   │  NUMBER OF        ┌──────────────┐│ │
│   │  CAMERAS [CAMERAS]│NUMERIC VALUE:││ │
│   │                   │DISPLAY ONLY  ││ │
│   └─────────────────────────────────┘   │
└─────────────────────────────────────────┘
```

FIG. 10

```
┌─ BOUNDARY BOX OPERATION ─┐
│  ┌─ BASIC SETTING ─────────────────────┐
│  │  ⊙ UPRIGHT      ○ FLAT              │
│  │    ORIENTATION    ORIENTATION       │
│  │  SHIFT ANGLE FROM NORMAL  [NUMERIC VALUE ▲▼]
│  │  [degrees]:                         │
│  └─────────────────────────────────────┘
│  ┌─ BOX SHAPE ─────────────────────────┐
│  │  x-DIRECTION [NUMERIC]  y-DIRECTION [NUMERIC ▲▼]
│  │  [TIMES]:    [VALUE  ]  [TIMES]:    [VALUE   ]
│  │  z-DIRECTION [NUMERIC ▲▼]
│  │  [TIMES]:    [VALUE   ]
│  │      BOUNDARY BOX ASPECT [NUMERIC ▲▼] [KEY]
│  └─────────────────────────────────────┘
│  ┌─ TRANSLATION ───────────────────────┐
│  │   x-DIRECTION [mm]: [NUMERIC VALUE ▲▼]
│  │   y-DIRECTION [mm]: [NUMERIC VALUE ▲▼]
│  │   z-DIRECTION [mm]: [NUMERIC VALUE ▲▼]
│  └─────────────────────────────────────┘
│  ┌─ ROTATION ──────────────────────────┐
│  │   ROTATION AXIS   [NUMERIC VALUE]
│  │   ROTATION ANGLE  [NUMERIC VALUE ▲▼]
│  └─────────────────────────────────────┘
│  ┌─ LOWEST SPATIAL FREQUENCY ──────────┐
│  │   [✓]  USE DEFAULT VALUES           │
│  │   SPATIAL FREQUENCY [cpr]  320 ▲▼   │
│  └─────────────────────────────────────┘
│  ┌─ CAMERA HORIZONTAL MOVE ────────────┐
│  │   [✓]  FRONT                        │
│  │       tan(x/L)   [NUMERIC VALUE ▲▼] │
│  └─────────────────────────────────────┘
└──────────────────────────────────────────┘
```

FIG. 11

```
┌─────────────┤ PROJECTION METHOD ├─────────────┐
│                                                │
│  ┌─ PARALLEL - PERSPECTIVE ──────────────────┐ │
│  │   ⦿ PERSPECTIVE                           │ │
│  │   ☑ MATCH WITH VISUAL RANGE               │ │
│  │     CAMERA DISTANCE/VISUAL   ┌─────────┐▲ │ │
│  │     RANGE [TIMES]            │NUMERIC  │  │ │
│  │                              │VALUE    │▼ │ │
│  │   ○ PARALLEL                 └─────────┘  │ │
│  └────────────────────────────────────────────┘ │
│                                                │
│  ┌─ REPRODUCTION DISTORTION REMOVAL METHOD ──┐ │
│  │   ☑ APPLIED                               │ │
│  └────────────────────────────────────────────┘ │
└────────────────────────────────────────────────┘
```

FIG. 12

```
┌─────────────┤ BACKGROUND BOARD ├──────────────┐
│   ☑ BACKGROUND BOARD INSTALLATION              │
│ ┌─ INSTALLATION POSITION ─────────────────────┐│
│ │   ☑ MATCH WITH BOUNDARY BOX INTERFACE (DEPTH)││
│ │ INSTALLATION POSITION/         ┌────────┐▲  ││
│ │ BOUNDARY BOX INTERFACE (DEPTH) │NUMERIC │   ││
│ │ [TIMES]:                       │VALUE   │▼  ││
│ └──────────────────────────────────────────────┘│
│ ┌─ BOARD IMAGE ───────────────────────────────┐│
│ │   ⦿ GENERATE FROM CENTER CAMERA             ││
│ │   ○ READ IMAGE FILE                         ││
│ │     FILE NAME  [              ▼]            ││
│ │     FILE TYPE  [              ▼]            ││
│ │                      ┌──────────────┐       ││
│ │                      │              │       ││
│ │                      │    IMAGE     │       ││
│ │                      │              │       ││
│ │                      └──────────────┘       ││
│ │                     W PIXELS × H PIXELS     ││
│ └──────────────────────────────────────────────┘│
└────────────────────────────────────────────────┘
```

FIG. 13

CLIPPING

☑ CLIPPING APPLIED

NEAR CLIP

☑ MATCH WITH BOUNDARY BOX INTERFACE (FRONT)

INSTALLATION POSITION/BOUNDARY BOX INTERFACE (FRONT) [TIMES]: [NUMERIC VALUE ▲▼]

HANDLING OF MODEL PUT ON CLIP FACE
- ⦿ CLIP
- ○ NOT CLIP

FAR CLIP

☑ INFINITE DISTANCE

☑ MATCH WITH BOUNDARY BOX INTERFACE (DEPTH)

INSTALLATION POSITION/BOUNDARY BOX INTERFACE (DEPTH) [TIMES]: [NUMERIC VALUE ▲▼]

HANDLING OF MODEL PUT ON CLIP FACE
- ⦿ CLIP
- ○ NOT CLIP

FIG. 14

OUTPUT SIZE

HORIZONTAL [PIXELS]: [NUMERIC VALUE ▲▼]

VERTICAL [PIXELS]: [NUMERIC VALUE ▲▼]

MULTI-VIEWPOINT IMAGE GENERATION APPARATUS, MULTI-VIEWPOINT IMAGE GENERATION METHOD, AND MULTI-VIEWPOINT IMAGE GENERATION PROGRAM

RELATED APPLICATION(S)

The present disclosure relates to the subject matter contained in Japanese Patent Application No. 2005-285437 filed on Sep. 29, 2005, which is incorporated herein by reference in its entirety.

FIELD

The present invention relates to a multi-viewpoint image generation apparatus, and a method and program product for generating a multi-viewpoint image to display object on a three-dimensional image display device screen.

BACKGROUND

A method of using a flat panel display typified by a liquid crystal display (LCD) having a matrix of pixels arranged on a two-dimensional plane and light ray control elements in combination is known as a three-dimensional image display device method. The method is called a three-dimensional image display device method without glasses; the directions of the light rays emitted from the pixels of the flat panel display are limited by the light ray control elements and parallax information responsive to the emission direction is presented to the pixels, whereby the observer is allowed to observe an image responsive to the horizontal or vertical position of the observer and recognize a three-dimensional image.

The light ray control elements include a lenticular sheet, a lens array, slits, a pinhole array, etc., for light ray direction control. For the lenticular sheet or the slits, the lens ridge line expands in the vertical direction viewed from the observer.

The three-dimensional image display device method without glasses is characterized by the fact that the area in which the observer can observe a three-dimensional image is limited. That is, the number of pixels that can be provided per light ray control element is limited and therefore the area in which an image responsive to the observation direction can be provided (the area is referred as "viewing zone") is also finite and if the observer is placed out of the area, he or she cannot observer the correct three-dimensional image.

In addition, a spectacle-type three-dimensional image display device method is known wherein the observer is made to wear spectacles and shuttering of left and right eyes and display switching are synchronized with each other for allowing the observer to recognize a parallax image conforming to both eyes of the observer. A spectacle-type three-dimensional image display device method is also known wherein while parallax images corresponding to the positions of both eyes of the observer are presented at the same time on the display, a micropole is used to make polarization directions orthogonal and polarizing plates with the polarization directions made orthogonal are provided in front of the left and right eyes of the observer, thereby presenting any desired parallax image to both eyes of the observer.

The spectacle-type three-dimensional image display device method is characterized by the fact that an image responsive to the observation position cannot be displayed (the observer cannot observer a three-dimensional image as he or she turns around the image=motion parallax does not exist) although the area in which the observer can observe a three-dimensional image is not limited. To overcome the problem, a method of realizing motion parallax by tracking the position of the head of the observer and switching the display in response to the position of the head is also available.

The three-dimensional image display device methods are common in that it is necessary to make the observer observe image acquired from more than one direction at the previously assumed observation position roughly matching the image acquisition direction to make the observer recognize a three-dimensional image.

The method of combining the light ray control elements with the display and switching the image in response to the observation position for the observer to observe the image corresponding to the observation position is the naked eye type method. The method of making the observer wear spectacles and shuttering the spectacles in synchronization with display switching for switching the parallax image displayed alternately on the display in response to the left and right eyes of the observer and the observation position of the observer is the spectacle type method.

The methods described above are common in that the images acquired from more than one direction are used to make the observer recognize a three-dimensional image. Thus, there are the points to be considered to acquire images more than one direction. Here, the points will be discussed as compared with two-dimensional image acquisition to reproduce a two-dimensional image.

When capturing and reproducing a two-dimensional image, the relationship between the capturing range and the reproduce range can be figured out easily. That is, the range defined by the viewing angle of the camera (=size of projection plane) is captured and is reproduced. Focus is achieved in the range of the depth of field and as capturing goes out of focus, a defocused image results.

In contrast, when capturing and reproducing a three-dimensional image, the capturing range of a camera array and the limit of depth defined by a display device need to be considered.

In the simplest case, the angles of view of a camera array are overlapped in the range corresponding to the display surface. In this case, the area in which the capturing ranges of the two cameras outermost placed overlap corresponds to the area always displayed on the display device while the observer is in the viewing zone if a three-dimensional image is reproduced. The area in which the capturing ranges do not overlap corresponds to the area which may or may not be seen as the frame of the display device hinders even when the observer observes in the viewing zone.

In a naked-eye-type stereoscopic display, the limit of depth corresponds to a "display limit" that is described in the following reference R1.

R1: "Analysis of resolution limitation of integral photgraphy" H. Hoshino, et al., J. Opt. Soc. Am. A., 15 (8), 2059 (1998)

As a three-dimensional image is displayed with the display limit as a guideline, the image quality that can sustain observation can be maintained. On the other hand, a spectacle-type three-dimensional image display device involves the pop-up amount limit defined in the sense of preventing fatigue caused by mismatch between congestion and adjustment.

For example, in some 100-inch twin-lens projection types of display device, when the viewing distance (L) is set to 3 m, the near-side limit is set to 500 mm and the far-side display limit is set to 1500 mm. In some twin-lens mobile telephone screens, the near-side limit is set to 80 mm and the far-side display limit is set to 160 mm. Thus, often the near-side limit is suppressed to about one-sixth the viewing distance and the far-side display limit is suppressed to about a half the viewing distance.

However, the suppression is determined due to the demands from a side of the three-dimensional image display device, and cannot be operated from the camera array side. Modifying the perspective projection degree or modifying the size is well known as the effect in capturing and reproducing a two-dimensional image. Specifically, the image captured at a position closer to the object than the observation position at the reproduce time becomes an image high in the perspective degree, and the image captured at a position more distant than the observation position becomes an image low in the perspective degree as it is captured with a zoom lens. Thus, the behavior of object over one camera can be understood comparatively by intuition.

On the other hand, in three-dimensional image display device, the direction in which a parallax image is acquired and the direction in which parallax information can be observed are completely matched, whereby the captured object is reproduced intact. However, representation can be made in such a manner that the perspective degree of the object is modified or thickness is modified (as such described in reference R2) or the size is modified by intentionally deviating from the relationship.

R2: "Distortion Control in a One-Dimensional Integral Imaging Autostereoscopic Display System with Parallel Optical Ray Groups" T. Saishu, et al., SID 04 Digest, 1438 (2004)

However, each multi-view image captured with a camera array and the image reproduced in a three-dimensional image display device are difficult to understand by intuition. For example, if the capturing interval of the camera array is halved, the thickness of the object-displayed on the three-dimensional image display device becomes roughly a half as compared with the case where the display thickness when the capturing interval is not halved is "1". To reproduce a three-dimensional image low in the perspective degree, it is necessary to extend the capturing distance and enlarge the camera-to-camera spacing in proportion to the expanded capturing distance and at the same time, modify the viewing angle so as to maintain the size of the projection plane.

Unlike a single camera used for capturing a two-dimensional image, the behavior of the camera array is difficult for the object user who creates three-dimensional image, to understand by intuition. If the object user understands, operation of moving and relocating the cameras becomes intricate as the number of the cameras increases.

SUMMARY

According to a first aspect of the invention, there is provided a multi-viewpoint image generation apparatus for generating a multi-viewpoint image for displaying an object on a three-dimensional image display device. The apparatus includes: a generation screen display unit that controls a two-dimensional image display device to display a two-dimensional image indicating an arrangement of the object in the multi-viewpoint image to be displayed on a the three-dimensional image display device; a modification command acquisition unit that acquires a modification command for modifying an arrangement of the object in the two-dimensional image; a camera control unit that modifies a camera condition including a number of cameras corresponding to the multi-viewpoint image, a placement position of each of the cameras, a size of the projection plane of each of the cameras, a point of regard, and a projection method, based on the modification command acquired by the modification command acquisition unit; and a multi-viewpoint image generation unit that generates the multi-viewpoint image acquired by the cameras being configured according to the camera condition modified by the camera control unit.

According to a second aspect of the invention, there is provided a method for generating a multi-viewpoint image for displaying an object on a three-dimensional image display device. The method includes: controlling a two-dimensional image display device to display a two-dimensional image indicating an arrangement of the object in the multi-viewpoint image to be displayed on a the three-dimensional image display device; acquiring a modification command for modifying an arrangement of the object in the two-dimensional image; modifying a camera condition including a number of cameras corresponding to the multi-viewpoint image, a placement position of each of the cameras, a size of the projection plane of each of the cameras, a point of regard, and a projection method, based on the acquired modification command; and generating the multi-viewpoint image acquired by the cameras being configured according to the modified camera condition.

According to a third aspect of the invention, there is provided a computer-readable program product for causing a computer to generating a multi-viewpoint image for displaying an object on a three-dimensional image display device. The program product causes the computer to perform procedures including: controlling a two-dimensional image display device to display a two-dimensional image indicating an arrangement of the object in the multi-viewpoint image to be displayed on a the three-dimensional image display device; acquiring a modification command for modifying an arrangement of the object in the two-dimensional image; modifying a camera condition including a number of cameras corresponding to the multi-viewpoint image, a placement position of each of the cameras, a size of the projection plane of each of the cameras, a point of regard, and a projection method, based on the acquired modification command; and generating the multi-viewpoint image acquired by the cameras being configured according to the modified camera condition.

BRIEF DESCRIPTION OF THE DRAWINGS

In the accompanying drawings:

FIG. 9 is a drawing that shows a display parameter setting screen displayed on a two-dimensional image display panel 21;

FIG. 10 is a drawing that shows a boundary box operation screen displayed on the two-dimensional image display panel 21;

FIG. 11 is a drawing that shows a projection method setting screen displayed on the two-dimensional image display panel 21;

FIG. 12 is a drawing that shows a background board setting screen displayed on the two-dimensional image display panel 21;

FIG. 13 is a drawing that shows a clipping setting screen displayed on the two-dimensional image display panel 21;

FIG. 14 is a drawing that shows an output size setting screen displayed on the two-dimensional image display panel 21;

DETAILED DESCRIPTION OF THE EMBODIMENTS

An embodiment of a multi-viewpoint image generation apparatus, a multi-viewpoint image generation method, and a multi-viewpoint image generation program according to the invention will be discussed in detail with reference to the accompanying drawings.

Figure 1:
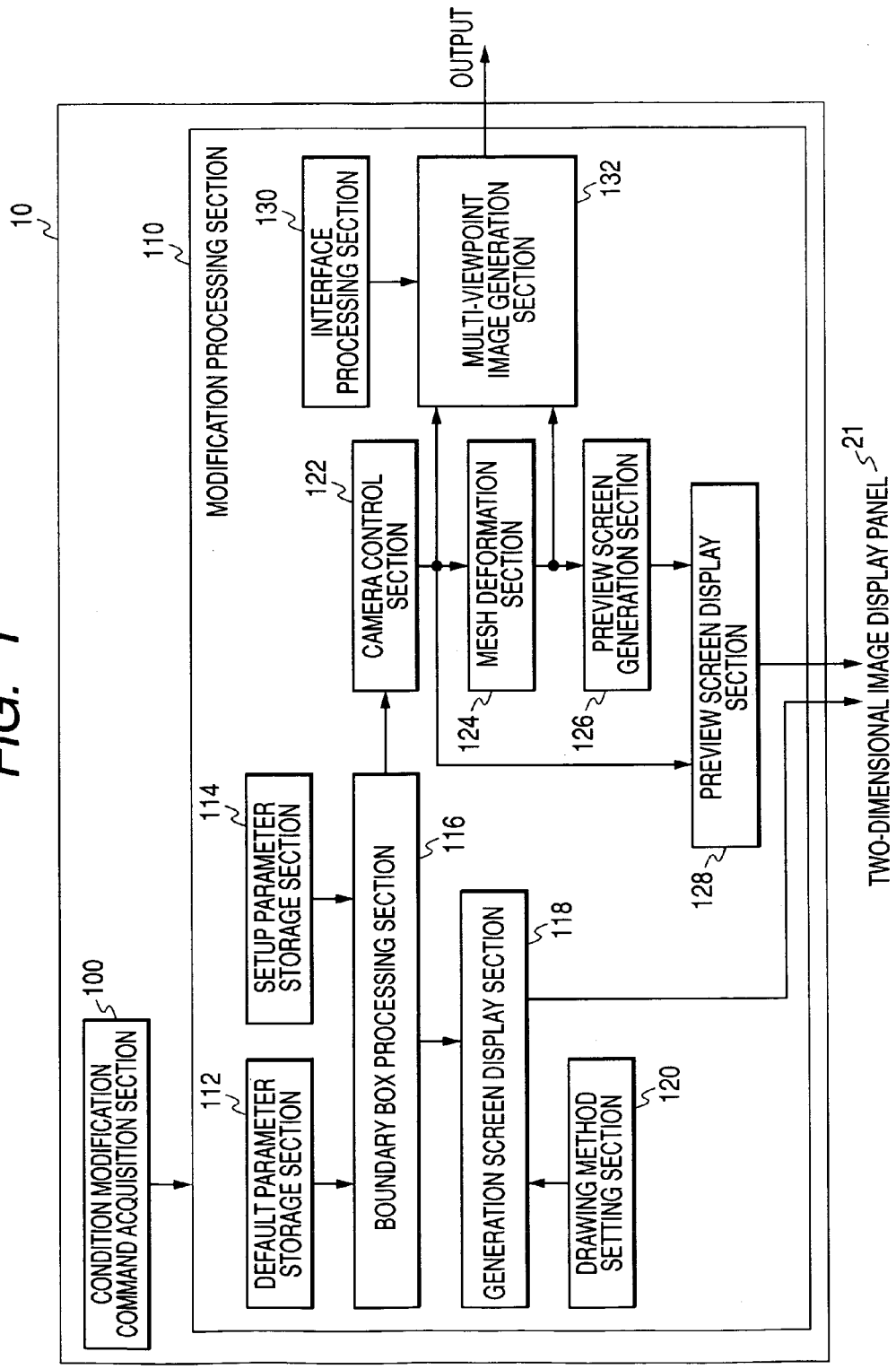
FIG. 1 is a block diagram to show the functional configuration of a multi-viewpoint image generation interface according to an embodiment.

FIG. 1 is a block diagram to show the functional configuration of a multi-viewpoint image generation interface 10 according to an embodiment. The multi-viewpoint image generation interface 10 displays a generation screen of a multi-viewpoint image on a two-dimensional image display panel 21 and generates a multi-viewpoint image corresponding to any three-dimensional image desired by a user (also referred to as "creator", or "operator") according to a command of the user.

Figure 2:
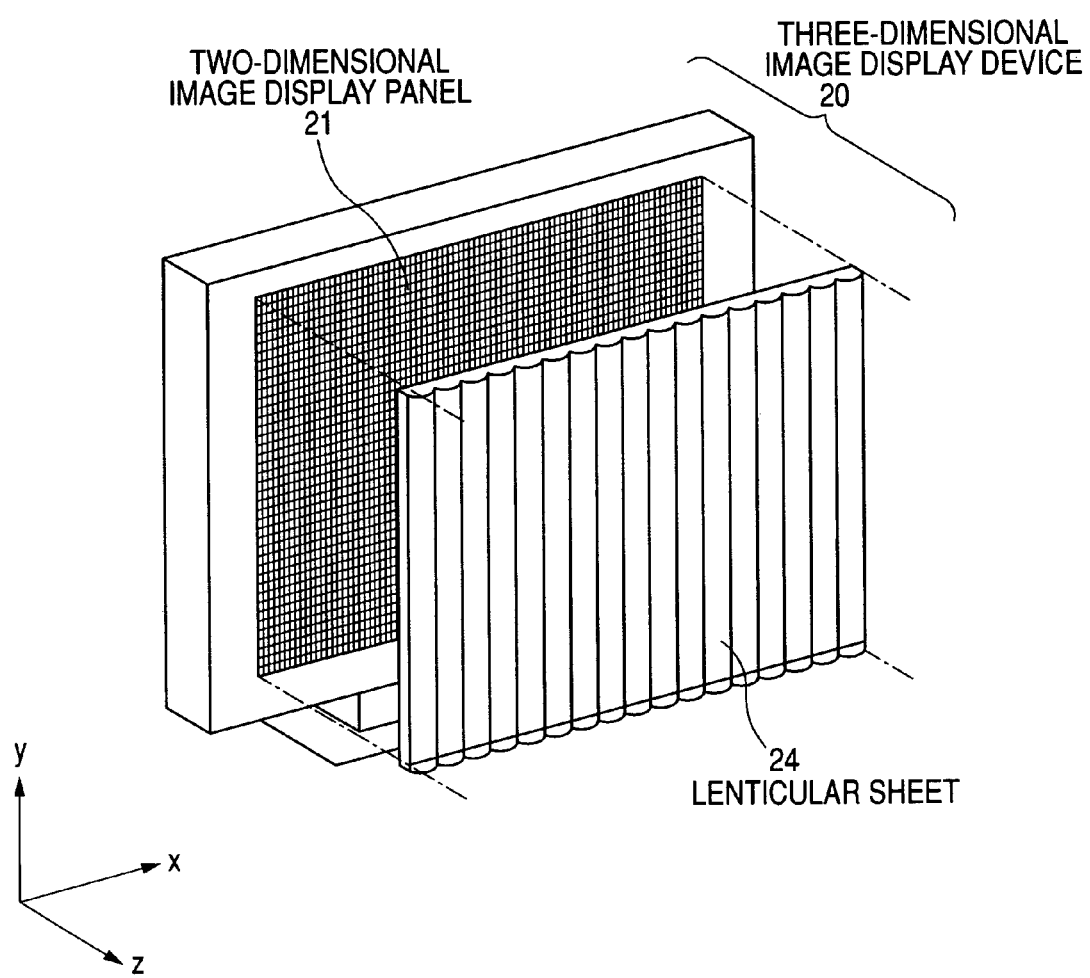
FIG. 2 is a drawing that shows a three-dimensional image display device for displaying a multi-viewpoint image generated by the multi-viewpoint image generation interface.

A three-dimensional image display device for displaying a multi-viewpoint image generated by the multi-viewpoint image generation interface 10 will be discussed. FIG. 2 is a drawing that shows a three-dimensional image display device 20 for displaying a multi-viewpoint image generated by the multi-viewpoint image generation interface 10. The three-dimensional image display device 20 has a two-dimensional image display panel 21 and a lenticular sheet 24.

It is assumed that the horizontal direction of the two-dimensional image display panel 21 is the x direction with the right as plus, that the vertical direction of the two-dimensional image display panel 21 is the y direction with the right as plus, and that the perpendicular direction to the two-dimensional image display panel 21, namely, the depth direction of the two-dimensional image display panel 21 is the z direction with the front direction of the two-dimensional image display panel 21 as plus. In the description to follow, the right-handed three-axis system is used.

Figure 3:
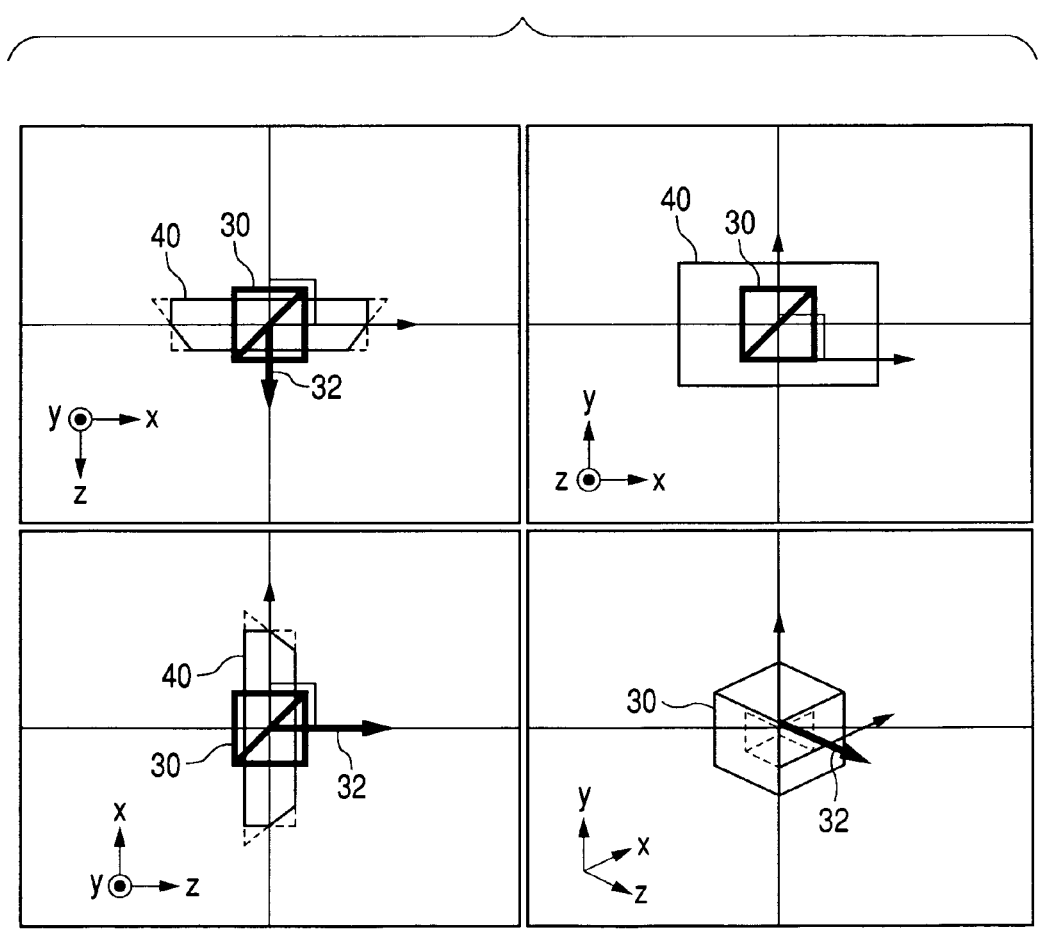
FIG. 3 is a drawing that shows a generation screen displayed on the three-dimensional image display device when a multi-viewpoint image is generated on the multi-viewpoint image generation interface.

FIG. 3 is a drawing that shows a generation screen displayed on the three-dimensional image display device 20 when a multi-viewpoint image is generated on the multi-viewpoint image generation interface 10. The generation screen is generated by a generation screen display unit 118 described later. A camera center vector 32 and a boundary box 40 as well as object 30 to be displayed three-dimensionally are displayed on the generation screen.

The camera center vector 32 defines the center coordinates of a camera array 50 described later. The direction of the camera center vector 32 also indicates the main observation position of a three-dimensional image after completion. The boundary box 40 is the area matching a three-dimensional image playable area in the three-dimensional image display device 20. The boundary box 40 is described later.

Further, the generation screen contains a front view of the object 30, a top view of a sectional view from the top, a side view of a sectional view from a side, and a perspective view of a three-dimensional image. Although the composition of the views is shown by way of example, the views corresponding to the xy plane, the yz plane, and the zx plane are provided for enabling the user to easily figure out the shape of the complete three-dimensional image.

Figure 4:
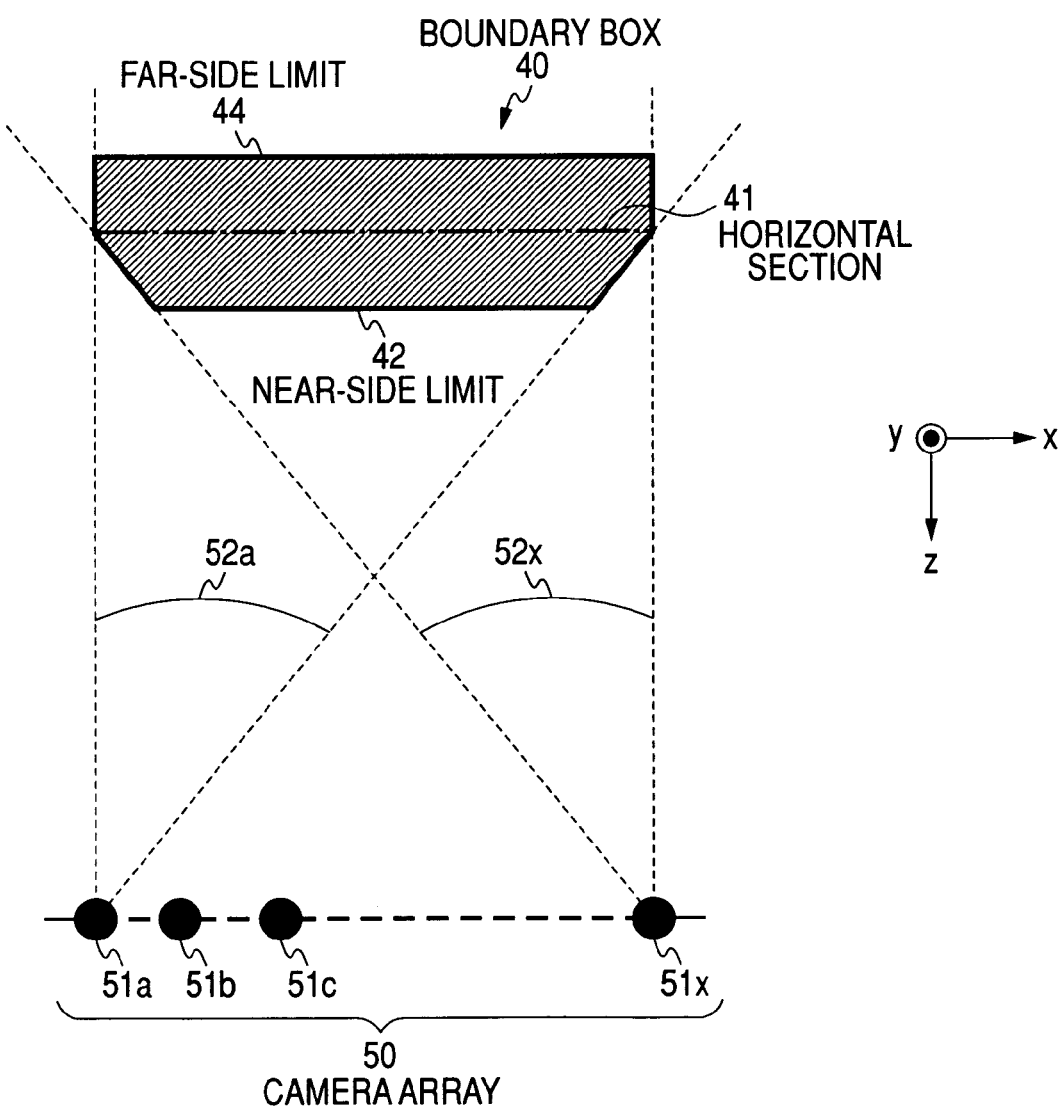
FIG. 4 is a drawing to describe a boundary box 40.

FIG. 4 is a drawing to describe the boundary box 40. For simplicity of the description, a multiple-lens system is taken as an example. The multiple-lens system is a system for reproducing a multi-viewpoint image acquired in a perspective projection manner on a locus roughly matching that at the image acquisition time in a perspective projection manner.

The boundary box 40 is an area defined by a horizontal section 41 corresponding to the horizontal section of the two-dimensional image display panel 21 and capturing ranges 52a and 52x of outermost two cameras 51a and 51x of the camera array 50 corresponding to a multi-viewpoint image. Further, the boundary box 40 has a boundary of a near-side limit 42 set on the cameral array 50 side, namely, in the near-side direction with the horizontal section 41 as the reference in the z direction. The boundary box 40 has a boundary of a far-side display limit 44 set on the opposite side to the cameral array 50, namely, in the far-side direction with the horizontal section 41 as the reference.

Figure 5:
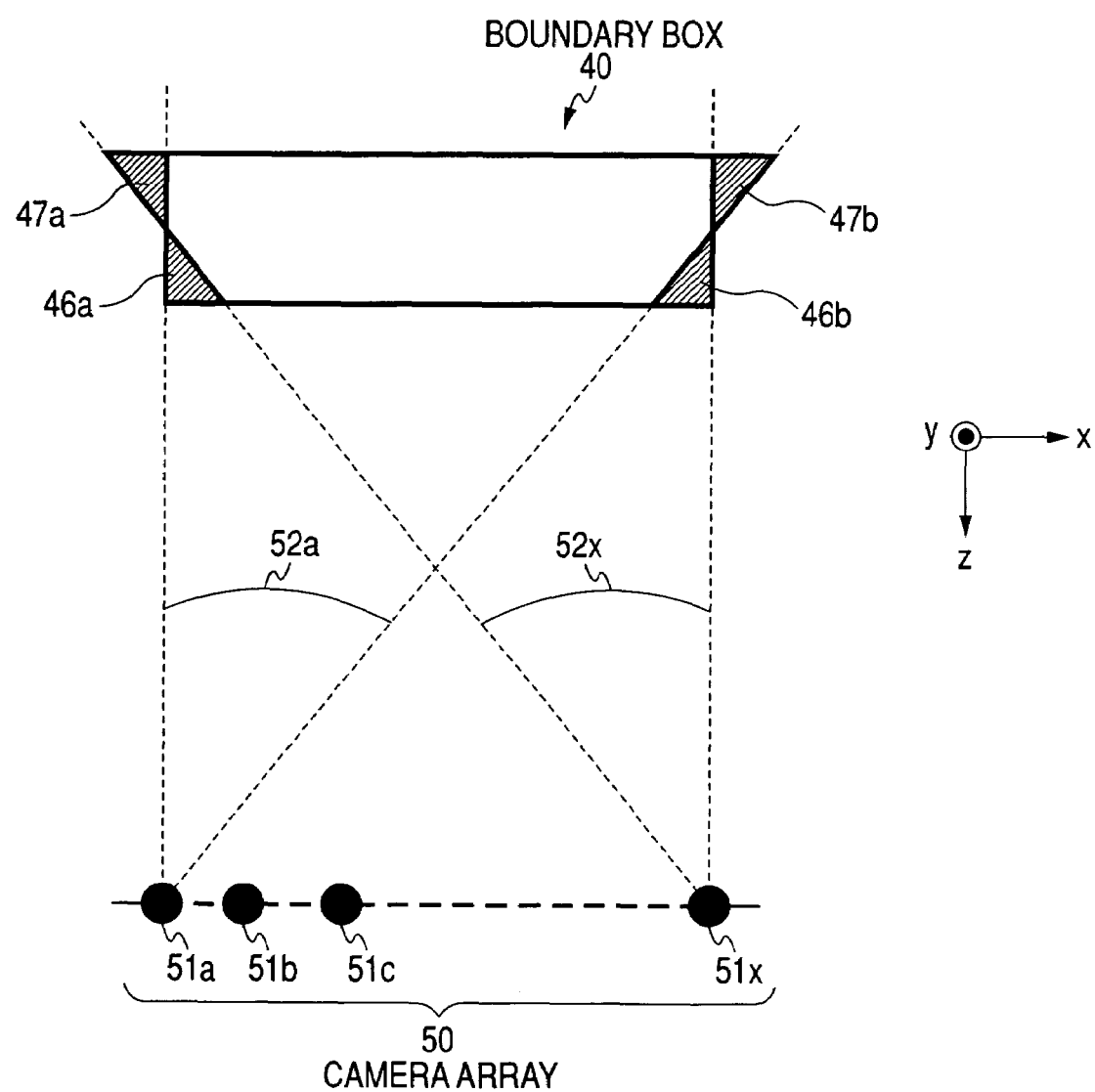
FIG. 5 is a drawing to describe zones 46a and 46b and zones 47a and 47b at both ends of the boundary box 40.

FIG. 5 is a drawing to describe zones 46a and 46b and zones 47a and 47b at both ends of the boundary box 40. The zones 46a and 46b are zones where there is a possibility that the three-dimensional image may be seen to be overlapped on the frame depending on the observation position. The zones 47a and 47b are zones where there is a possibility that the three-dimensional image may be seen behind the frame depending on the observation position.

A display failure that if the three-dimensional image displayed in the zones 46a, 46b (namely, the pop-up zone) is overlapped on the frame, the pop-up position is forcibly pulled in to the frame position (frame effect) is known. On the other hand, there is a possibility that the three-dimensional image may be seen in the zones 47a, 47b depending on the observation position. Therefore, a three-dimensional image needs to be generated considering the fact that the image in the area may be seen. Thus, it can be said that the zones 46a and 46b and the zones 47a and 47b are display zones which need to be considered with respect to the three-dimensional image display device.

Figure 6:
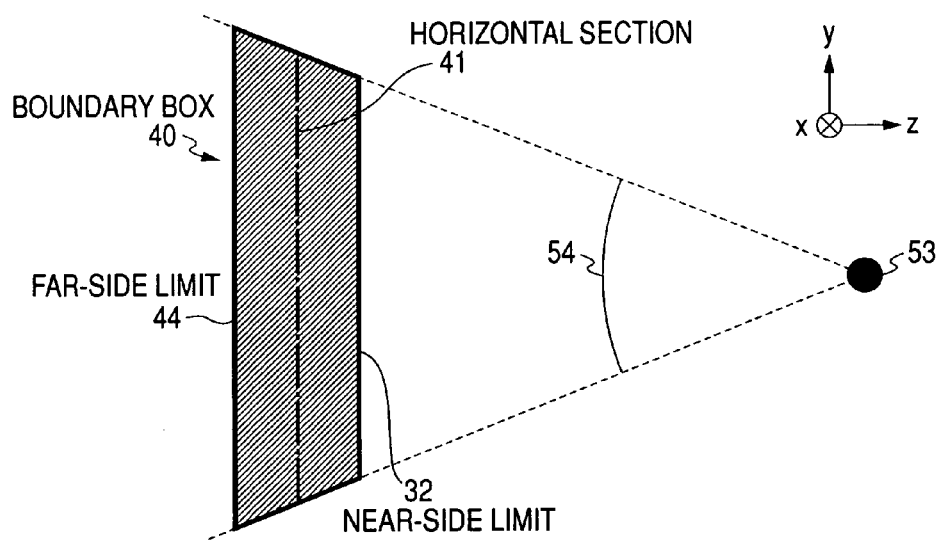
FIG. 6 is a sectional view of the boundary box 40 seen from the −x direction.

FIG. 6 is a sectional view of the boundary box 40 when it is seen from the −x direction. FIG. 6 shows the boundary box 40 when parallax information is not given in the vertical direction, namely, the y direction. Since parallax is not given in the y direction, the number of positions of a camera 53 is one. The boundary box 40 is defined by a capturing range of the camera 53. Since parallax information is not given, the areas corresponding to the zones 46a and 46b and the zones 47a and 47b described in FIG. 5 do not occur.

Generally, if the number of parallaxes is increased in the three-dimensional image display device, the resolution of the three-dimensional image display device is degraded (naked eye type) or the head tracking rate needs to be raised (spectacle type). Thus, the load on the device is increased. In order to solve this problem, it is generally configured that, only parallax information in the horizontal direction required for bringing a three-dimensional shape close as in the example shown in FIG. 6 is presented.

Figure 7:
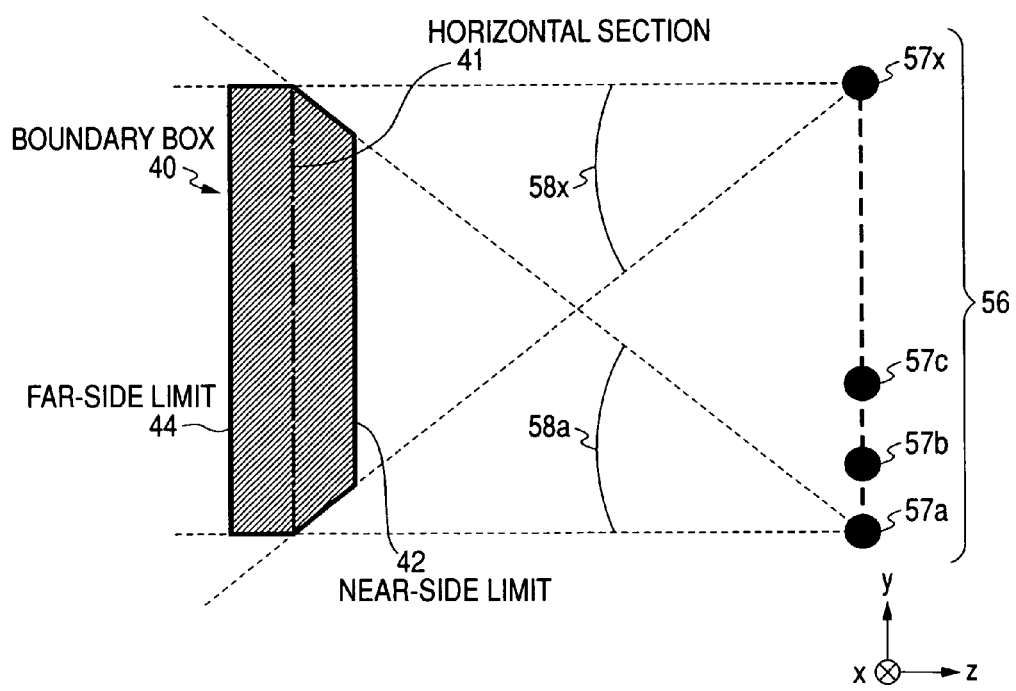
FIG. 7 is a sectional view of the boundary box 40 for also acquiring a multi-viewpoint image in the vertical direction when the boundary box is seen from the x direction.

As another example, a multi-viewpoint image may be acquired also in the vertical direction. FIG. 7 is a sectional view of the boundary box 40 for also acquiring a multi-viewpoint image in the vertical direction when the boundary box is seen from the x direction;

Referring again to FIG. 1, the multi-viewpoint image generation interface 10 includes a condition modification command acquisition unit 100 for acquiring various condition modification commands from the user and a modification processing unit 110 for performing processing involved in condition modification in generation of a multi-viewpoint image based on the condition modification command acquired by the condition modification command acquisition unit 100.

The modification processing unit 110 has a default parameter storage unit 112, a setup parameter storage unit 114, a boundary box processing unit 116, a generation screen display unit 118, a drawing method setting unit 120, a camera control unit 122, a mesh deformation unit 124, a preview screen generation unit 126, a preview screen display unit 128, a boundary surface processing unit 130, and a multi-viewpoint image generation unit 132.

The condition modification command acquisition unit 100 accepts various condition modification commands from the outside. Specifically, when the user enters various conditions in the generation screen displayed on the two-dimensional image display panel 21 while generating a three-dimensional image, the modification command indicating the entries is sent to the condition modification command acquisition unit 100.

The default parameter storage unit 112 stores default parameters of the three-dimensional image display device. The parameters are parameters of the three-dimensional image display device for displaying the three-dimensional image generated by the multi-viewpoint image generation interface 10.

The setup parameter storage unit 114 stores the parameters of the three-dimensional image display device acquired through the condition modification command acquisition unit 100. The parameters are parameters generated according to the user entry.

To generate a three-dimensional image displayed on a three-dimensional image display device of different specifications from the three-dimensional image display device corresponding to the parameters stored in the default parameter storage unit 112, the user can enter the parameters of the three-dimensional image display device for displaying a three-dimensional image in a condition setting screen (described later) displayed on the two-dimensional image display panel 21. Accordingly, the entries are sent through the condition modification command acquisition unit 100 to the default parameter storage unit 112 and are stored therein.

The boundary box processing unit 116 draws the boundary box 40 based on the default parameters stored in the default parameter storage unit 112. It also draws the boundary box 40 according to the condition indicated in the modification command acquired by the condition modification command acquisition unit 100. The generation screen display unit 118 displays the boundary box 40 drawn by the boundary box processing unit 116 on the two-dimensional image display panel 21 together with the object 30.

The drawing method setting unit 120 modifies the drawing method according to the modification command from the condition modification command acquisition unit 100. Here, the drawing method is a display method on the two-dimensional image display panel 21 such as the line thickness, color, etc., when the object 30 and the boundary box 40 are displayed on the two-dimensional image display panel 21. The generation screen display unit 118 displays the object 30 according to the drawing method set by the drawing method setting unit 120.

The camera control unit 122 determines the arrangement of the camera array 50 corresponding to the multi-viewpoint image to be generated based on the boundary box 40 drawn by the boundary box processing unit 116. For example, the spacing between the cameras constituting the camera array 50 and the distance from the projection plane of the camera array are determined. The position of the point of regard is also modified according to the modification command acquired by the condition modification command acquisition unit 100. Here, the point of regard corresponds to the face center of the horizontal section 41 of the boundary box 40.

Further, the resolution of the camera is modified according to the modification command acquired by the condition modification command acquisition unit 100. Further, the number of the cameras corresponding to the multi-viewpoint image is modified according to the modification command acquired by the condition modification command acquisition unit 100. Further, the size of the projection plane (=viewing angle) is modified according to the modification command acquired by the condition modification command acquisition unit 100.

The mesh deformation unit 124 deforms the mesh of the object 30 according to the command from the condition modification command acquisition unit 100. Accordingly, distortion caused by alienation between the shape of the object 30 in the capturing system and that in the reproduce system, more particularly, anisotropic alienation between the light ray locus for capturing and that for reproduce can be corrected. As a specific example of the anisotropic alienation, the case where alienation between the light ray locus for capturing and that for reproduce in the perpendicular direction differs from that in the projection direction can be named (examples are described in the reference R2). The anisotropic alienation may be used aggressively as modification of the perspective degree in the reproduce mode, as described later in detail.

The preview screen generation unit 126 generates a preview screen. The preview screen is a screen for indicating a state in which the multi-viewpoint image obtained from the camera array 50 controlled by the camera control unit 122 is displayed on the three-dimensional image display device screen, namely, the three-dimensional image of the object 30.

Specifically, rendering from a view camera placed at the observation reference position assumed to be the position of the observer and directed to the point of regard is performed. The view camera corresponds to the initial value of the camera center of the camera array. The view camera and the camera center are positioned on the locus pointed to by the camera center vector. Operation of modifying the distance from the point of regard of the camera center is only perspective degree modification. If the object 30 is subjected to mesh deformation, inverse processing to the mesh deformation, namely, inverse mesh deformation is performed. The preview screen display unit 128 displays the preview screen on the three-dimensional image display device 20.

The boundary surface processing unit 130 performs processing of the boundary surface of the displayable area according to the command from the condition modification command acquisition unit 100. Specifically, the boundary surface processing unit 130 performs generates a background board and performs clipping processing. The multi-viewpoint image generation unit 132 obtains a plurality of parallax images from the camera array 50 arranged by the camera control unit 122, namely, generates a multi-viewpoint image. At this time, the clipping processing result of the boundary surface processing unit 130 is used. Further, if mesh deformation is executed, a multi-viewpoint image for the object 30 after subjected to the mesh deformation is generated.

When the multi-viewpoint image generation interface 10 is started up, the boundary box 40 corresponding to the default three-dimensional image display device is drawn on the two-dimensional image display panel 21 based on the default parameters stored in the default parameter storage unit 112. The default three-dimensional image display device has a 15.4-inch W-UXGA panel and a lenticular sheet. The detailed specifications are as listed in Table 1 shown below.

| Parameters for Three-dimensional display device | | |
|---|---|---|
| Np (number of parallaxes) | [mm] | 12 |
| L (observation distance) | [mm] | 600 |
| Parameters for Display panel | | |
| nx (number of horizontal pixels) | [pixels] | 1920 |
| ny (number of vertical pixels) | [pixels] | 1200 |
| W (horizontal width of display area) | [mm] | 331.2 |
| H (vertical width of display area) | [mm] | 207 |
| pp (width and height of pixel) | [mm] | 0.1725 = W/nx = H/ny |
| psp (horizontal width of subpixel) | [mm] | 0.0575 = pp/3 |
| Parameters for Lenticular sheet | | |
| g (focal distance in terms of air) | [mm] | 1.29 |
| pe (exit pupil spacing of lens) | [mm] | 0.689 = psp * Np * L/(L + g) |
| θ (emergence angle: single side) | [degree] | 15.0 = atan (psp * L/g * Np/L) |

From Table 1, the emergence angle of a light ray emitted from a single lens is ±15 degrees, namely, 30 degrees in total.

A collecting point occurs at the observation reference viewing distance assumed to be the position at which the observer observes the three-dimensional image (L=600 mm) and the light rays emitted from all lenses overlap at the observation reference viewing distance (L). The collecting point spacing is 26.7 mm (=psp*L/g) which is sufficiently narrower than the interocular distance (substantially 65 mm). Therefore, the three-dimensional image involving motion parallax can be observed in the proximity of the viewing distance.

However, the observer moves freely to some extent. Thus, often the observer is placed out of the observation reference viewing distance (L). Since the light rayspacing is narrow, it is considered that the observer observes a three-dimensional image involving crosstalk caused by seeing a plurality of pieces of parallax information at the same time. Considering the circumstances, the near-side limit and the far-side display limit in the three-dimensional image display device can be calculated as the pop-up depth limit of IP system. The details are described in the reference R1.

The lowest spatial frequency (β) of the object to be displayed on the three-dimensional image display device is set to 320 cpr (cycles per radian). It is empirically known that the value is the frequency just before the observer feels that the image is too coarse when the image is displayed on an 8-inch to 32-inch display.

The near-side limit (zn) wherein 320 cpr is guaranteed is obtained according to the following Expression (1).

$$zn = L(2*((L+g)/L)*psp/g*\beta+1) \quad (1)$$
$$= 20.3 \text{ mm}$$

The far-side display limit (zf) is obtained according to the following Expression (2).

$$zf = -L/(2*((L+g)/L)*psp/g*\beta-1) \quad (2)$$
$$= -21.7 \text{ mm}$$

Thus, the width in the z direction of the boundary box 40 is obtained according to the following Expression (3).

$$zn-zf=42.0 \text{ mm} \quad (3)$$

The camera array 50 corresponding to the boundary box 40 is placed on the display surface where the collecting point occurs, namely, at a position 600 mm (=L) distant from the two-dimensional image display panel 21. Further, 12 cameras are automatically installed every collecting point spacing (26.7 mm=psp*L/g) as the default arrangement of the camera array 50. The center of the camera array is the initial value of the camera center, namely, the position where the view camera is placed.

If no modification is made with the conditions, the next operation is performed. That is, rendering processing may be performed for generating a multi-viewpoint image. However, if the user wants to generate a multi-viewpoint image under different conditions from the default conditions stored in the default parameter storage unit 112, the user may enter condition modification in the display screen displayed on the two-dimensional image display panel 21. Accordingly, the condition modification command acquisition unit 100 acquires the modification command corresponding to the entries and the modification processing unit 110 performs processing corresponding to the modification command.

Figure 8:
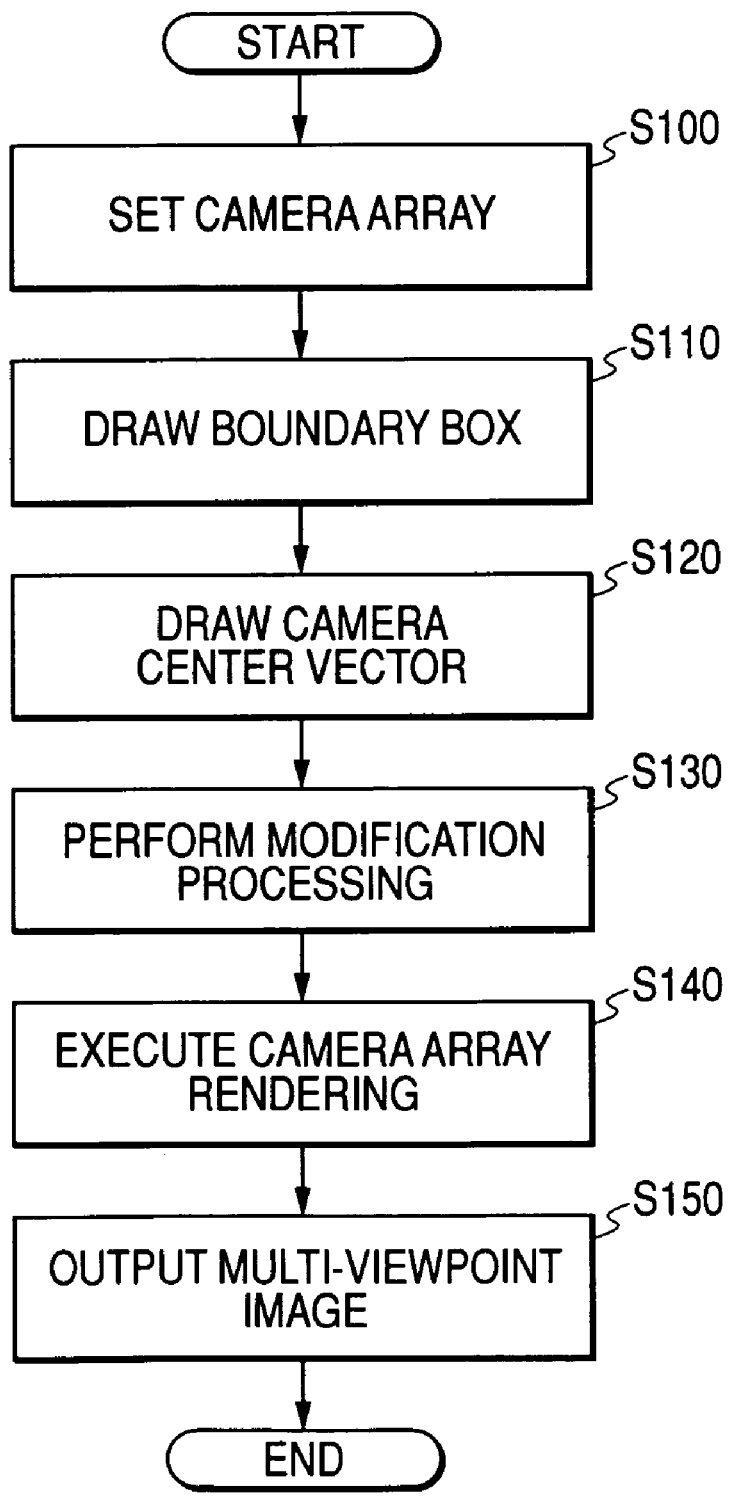
FIG. 8 is a flowchart to show multi-viewpoint image generation processing performed by the multi-viewpoint image generation interface 10 for modifying conditions.

FIG. 8 is a flowchart to show multi-viewpoint image generation processing performed by the multi-viewpoint image generation interface 10 for thus modifying the conditions. First, when the multi-viewpoint image generation interface 10 is started, the camera control unit 122 lays out the camera array 50 corresponding to the specifications of the default three-dimensional image display device as the default arrangement (step S100), as described above. Next, the boundary box 40 corresponding to the camera array 50 is drawn (step S110). Further, the camera center vector 32 is also drawn (step S120). The boundary box 40 and the camera center vector 32 are displayed on the two-dimensional image display panel 21 by the generation screen display unit 118. The camera center vector 32 is indicated by an arrow-like symbol directed to the center coordinates of the camera array 50 as shown in FIG. 3.

Next, the modification processing unit 110 performs modification processing according to various condition modification commands acquired by the condition modification command acquisition unit 100 (step S130) and executes camera array rendering under the camera condition for generating a multi-viewpoint image (step S140). Next, the generated multi-viewpoint image is output to the outside (step S150).

The various condition modification commands acquired by the condition modification command acquisition unit 100 at step S130 are entered by the user in the generation screen. FIGS. 9-14 are drawing that show condition setting screens for entering the descriptions corresponding to the various condition modification commands acquired by the condition modification command acquisition unit 100 in the modification processing (step S130).

FIG. 9 is a drawing that shows a display parameter setting screen displayed on the two-dimensional image display panel 21. The display parameter setting screen is a screen for setting the parameters of the three-dimensional image display device for displaying the three-dimensional image generated by the multi-viewpoint image generation interface 10.

Thus, the screen is provided with setting fields of the three-dimensional image display device type, the exit pupil type, the number of parallaxes, the two-dimensional image display, the viewing zone setting condition, the display limits, and the number of views as the parameters of the three-dimensional image display device, enabling the user to enter any desired conditions in the screen.

The three-dimensional image display device type is set in accordance with the type of system used in the three-dimensional image display device. In the embodiment, the three-dimensional image display device type is configured to be selectable from one of 1) Integral Imaging system (II system) that provides no collecting point at the observation reference position on the locus of the light ray presenting parallax, and 2) Multi-View system that provides the collecting point. The typical II system uses a parallel light ray. When parallax is presented only in the horizontal direction (1D-II: One-dimensional Integral Imaging system), a multi-viewpoint image captured as parallel projection in the horizontal direction and perspective projection in the vertical direction is used, whereby a correct three-dimensional image with no distortion can be displayed. On the other hand, in the Multi-View system, the light ray is designed so as to cause a collecting point to occur at the observation reference position and thus a perspective projection image can be used.

If vertical parallax information and horizontal parallax information are presented, a lens array or a pinhole array can be selected as the exit pupil type. If only horizontal parallax information is presented, a lenticular sheet or slit and the inclination of the lenticular sheet (θ) can be selected. Further, the focal distance in terms of air and the number of parallaxes, the number of pieces of parallax information emitted from one exit pupil, can be specified. If only horizontal parallax information is presented, the horizontal value is specified as the number of parallaxes. Further, if parallax information is also presented in the vertical direction, the vertical value is also specified in addition to the value in the horizontal direction.

The resolution and the size can also be specified as the parameters of the two-dimensional image display. The observation reference viewing distance is given as the viewing zone setting condition. The number of cameras is determined so that the viewing zone reaches the maximum in the viewing distance (as described in JP-A-2004-212666) and the front position corresponding to the near-side limit and the depth position corresponding to the far-side display limit are also calculated as the display limits (as described in the reference R1).

The standard display models are provided as parameters and the user is allowed to select the standard display model in response to the three-dimensional image display device used by the user, so that the parameter entry burden on the user can be lessened.

Further, the user enters a new parameter and selects "SAVE CURRENT SETTINGS" in the condition setting screen shown in FIG. 9, whereby the entered parameter can be stored as a configuration file. The configuration file is stored in the setup parameter storage unit 114. The configuration file stored in the setup parameter storage unit 114 can be selected as "READ CONFIGURATION FILE" is selected in the condition setting screen shown in FIG. 9; the user-registered parameter can also be again called. Accordingly, the need for the user to repeatedly enter the same condition can be eliminated.

FIG. 10 is a drawing that shows a boundary box operation screen displayed on the two-dimensional image display panel 21. As the basic setting, the three-dimensional image display device 20 can be set to upright orientation or flat orientation. Here, the user is allowed to choose one of the two representative orientations of upright and flat, but the user may be enabled to select any desired angle. Further, the shift angle from the normal can also be set. Here, the shift angle from the normal refers to the angle between the observation direction and the normal of the three-dimensional image display device 20.

As the box shape, the dimensions of the boundary box 40 in the x, y, and z directions can be set. Further, the aspect can also be set. As translation, the move distances of the position of the boundary box 40 relative to the x, y, and z directions can be set. Rotation can be specified relative to the x, y, and z directions. Further, the conditions of lowest spatial frequency and camera horizontal move can be set.

Here, the lowest spatial frequency refers to the lowest spatial frequency guaranteed when the object 30 is displayed three-dimensionally. The camera horizontal move refers to move of both the position of the camera array 50 and the point of regard. Accordingly, the center of the multi-viewpoint image to be generated is modified. The rotation refers to rotation of the position of the camera array 50 with the point of regard fixed. That is, the projection plane also rotates. Accordingly, the plane of the object 30 placed at the front in the multi-viewpoint image is modified.

The camera horizontal move refers to move of only the position of the camera array 50 with the point of regard fixed. More specifically, if the camera array 50 is positioned at the front of the projection plane (=display surface of the three-dimensional image display device 20) in the horizontal move, tan (x/L) is given as 0. The camera array 50 shifts to the left or right from the projection plane as the numeric value increases or decreases from 0.

For example, to display a multi-viewpoint image in a direction shifted to the right from the front of the observer, it is desirable that a multi-viewpoint image in a state in which the observer observes the direction shifted to the right accordingly should be generated. In this case, the appropriate direction is specified in "CAMERA HORIZONTAL MOVE."

FIG. 11 is a drawing that shows a projection method setting screen displayed on the two-dimensional image display panel 21. Perspective or parallel projection method can be chosen as the camera array attribute. Perspective and parallel projection cameras differ in the overlap range of the capturing ranges of the outermost two cameras. Thus, the shape of the boundary box 40 varies depending on the camera attribute. The played-back three-dimensional image also becomes an image on which the projection method is reflected. Here, the case where alienation exists between the capturing camera condition and the reproduce display condition is possible.

More specifically, in the 1D-II system using a parallel light ray, if a parallax image is seen through in the vertical direction and is captured in parallel in the horizontal direction, a three-dimensional image with no distortion can be displayed (as described in the reference R2). To use such 3D-CG generation software with no camera installed, it is possible to deform object and acquire an equivalent image with the perspective projection or parallel projection camera as standard equipment. For example, to use the parallel projection camera, the object may be deformed the vertical direction so as to narrow toward the depth; and to use the perspective projection camera, the object is deformed in the horizontal direction so as to narrow toward the front, whereby the alienation between the light rays at the image acquisition time and the image reproduce time can be overcome. Applying or no applying of distortion removal processing of automatically removing the image distortion at the reproduce time can be chosen. In the embodiment, the perspective projection is default and if the parallel projection is chosen, the boundary box is redrawn. The mesh deformation is described later in detail.

FIG. 12 is a drawing that shows a background board setting screen displayed on the two-dimensional image display panel 21. Whether or not a background board is to be installed can be specified and the background board installation position and an image used as the background board can be set. FIG. 13 is a drawing that shows a clipping setting screen displayed on the two-dimensional image display panel 21. Applying or no applying of clipping can be chosen. Various settings in near clip and distant clip can be made. FIG. 14 is a drawing that shows an output size setting screen displayed on the two-dimensional image display panel 21. In the screen, the output size of a multi-viewpoint image, namely, the resolution can be set.

Figure 15:
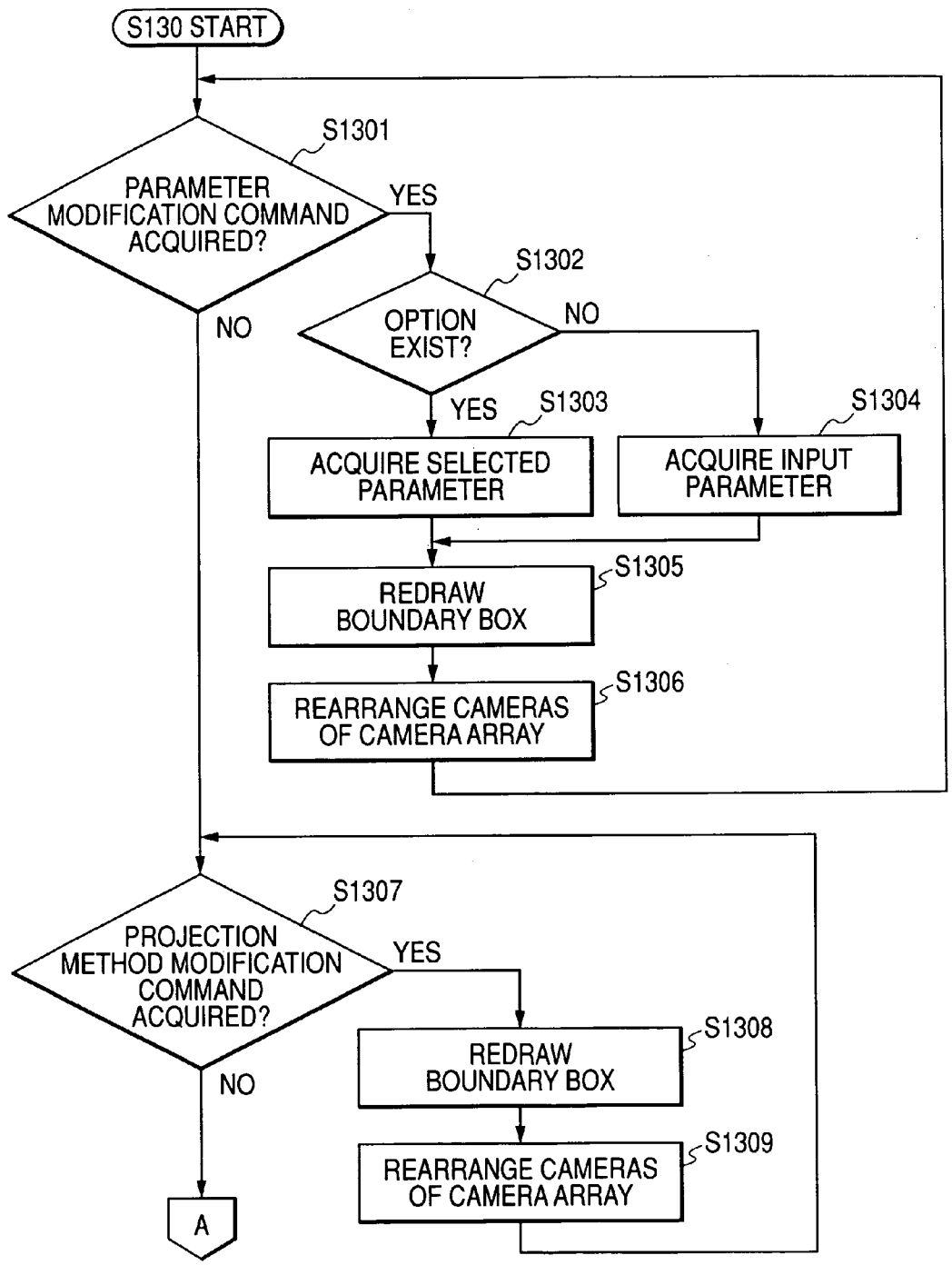
FIG. 15 is a flowchart to show detailed processing in modification processing (step S130) described in FIG. 8.

FIG. 15 is a flowchart to show detailed processing in the modification processing (step S130) described in FIG. 8. As previously described with reference to FIG. 8, the default camera array is set following the default value of the three-dimensional image display device, and the boundary box matched with the camera array is drawn. At this time, if the condition modification command acquisition unit 100 acquires a parameter modification command indicating parameter modification of the three-dimensional image display device (YES at step S1301), the boundary box processing unit 116 again calculates the boundary box 40 based on the parameter indicated in the parameter modification command.

If the standard display is modified in the display parameter setting screen shown in FIG. 9, if the user enters a condition, or if "READ CONFIGURATION FILE" is selected, the condition modification command acquisition unit 100 acquires a three-dimensional image display device parameter modification command containing the entry.

If "READ CONFIGURATION FILE" is selected and the configuration file is specified in the display parameter setting screen shown in FIG. 9, it is determined at step S1302 that option exists (YES at S1302), and the boundary box processing unit 116 acquires the parameter in the specified configuration file from the default parameter storage unit 112 (step S1303).

On the other hand, if it is determined at step S1302 that no option exists (NO at S1302), the boundary box processing unit 116 acquires parameter modification command containing the description set by the user in the display parameter setting screen (step S1304).

Next, the boundary box processing unit 116 again calculates the boundary box 40 based on the parameter indicated in the acquired parameter modification command (S1305). Next, the camera control unit 122 determines the number of cameras of the camera array, the arrangement of the cameras of the camera array, the point of regard, and the projection plane size based on the calculation result of the boundary box processing unit 116, and lays out the cameras set to the viewing angle reflecting the determined projection plane size at the determined positions (step S1306).

The parameter modification commands acquired by the boundary box processing unit 116 specifically include a resolution modification command indicating modification of the resolution of the two-dimensional image display panel 21 forming a part of the three-dimensional image display device 20, a size modification command indicating modification of the size of the two-dimensional image display panel 21, a display format modification command indicating modification of the three-dimensional display format in the three-dimensional image display device 20, a "focal distance in terms of air" modification command indicating modification of the focal distance in terms of air, and the like.

For example, assume that a resolution modification command is acquired and the vertical and horizontal default settings of the resolution of the two-dimensional image display panel 21 are doubled. In this case, the near-side limit and the far-side display limit become 39.2 mm and −45.1 mm respectively. That is, the boundary box 40 having the whole depth of 84.4 mm is redrawn. That is, the shape of the boundary box 40 is modified. In this case, however, the arrangement of the camera array 50 is not modified.

If a size modification command is acquired, the size of the boundary box 40 is modified although the shape of the boundary box 40 is not modified. If a display format modification command is acquired, the shape of the boundary box 40 is modified. The projection method and the arrangement of the camera array 50 and the projection plane size are modified accordingly.

On the other hand, if a "focal distance in terms of air" modification command is acquired and the focal distance in terms of air (g) is modified to 1.96 mm, the emergence angle (θ) becomes 10.0 degrees. In this case, the camera spacing is automatically modified to 17.6 mm (=psp*L/g) with the projection plane kept at the position of the horizontal section 41.

At this time, the near-side limit 42 and the far-side display limit 44 become 30.2 mm and −33.6 mm respectively. That is, the boundary box 40 having the whole depth of 63.9 mm is redrawn.

Further, the number of the cameras of the camera array is modified in addition to the redraw of the boundary box and again arranging the cameras of the camera array. If the inclination of the lenticular sheet (θ) is zero, the number of cameras (N) is determined according to the following Expression (4).

$$N = ROUND(ROUNDDOWN(nx \times 3/2/(Np \times (L=G)/L)) \times \qquad (4)$$
$$(Np \times (L+g)/L) - Np)) \times 2 + Np$$

In the Expression (4), ROUND means rounding a number to the nearest integer and ROUNDDOWN means rounding down a number to the nearest integer.nx is the number of pixels of flat panel display On the other hand, if the inclination of the lenticular sheet (θ) is "arctan(1/n)≠0" (with the vertical direction set to 0 degrees), the number of cameras (N) is determined according to the following Expression (5).

$$N = ROUND(ROUNDDOWN(nx \times n/2/(Np \times (L=G)/L)) \times \qquad (5)$$
$$(Np \times (L+g)/L) - Np)) \times 2 + Np$$

Next, the process proceeds to step S1307 and if a projection method modification command is acquired (YES at step S1307), the process proceeds to step S1308. If perspective or parallel is chosen as the projection method in the projection method setting screen shown in FIG. 11, the condition modification command acquisition unit 100 acquires the projection method modification command containing the choice.

The boundary box processing unit 116 again calculates the boundary box 40 based on the projection method indicated in the projection method modification command (S1308). Further, the camera control unit 122 again lays out the cameras of the camera array (step S1309).

Here, arranging the camera array with the point of regard and the projection plane kept constant to acquire parallax information means that a lens shift function is required to acquire parallax image. Since some 3D-CG generation software may have no lens shift function, a technique of capturing at a wide angle and cutting out a part may be adopted as a method of providing an image equivalent to lens shift in perspective projection.

Although not described in detail, the point of regard of each camera of the camera array in the case is set so that the line connecting the camera and the point of regard becomes perpendicular to the flat plane containing the projection plane. That is, even if the point of regard is fixed to the projection plane from the user, the point of regard of each camera of the camera array may be moved in response to the layout of the cameras because the operation corresponding to lens shift is performed. In such a case, in the projection method modification command, the point of regards of the cameras of the camera array are also again arranged internally.

Figure 16:
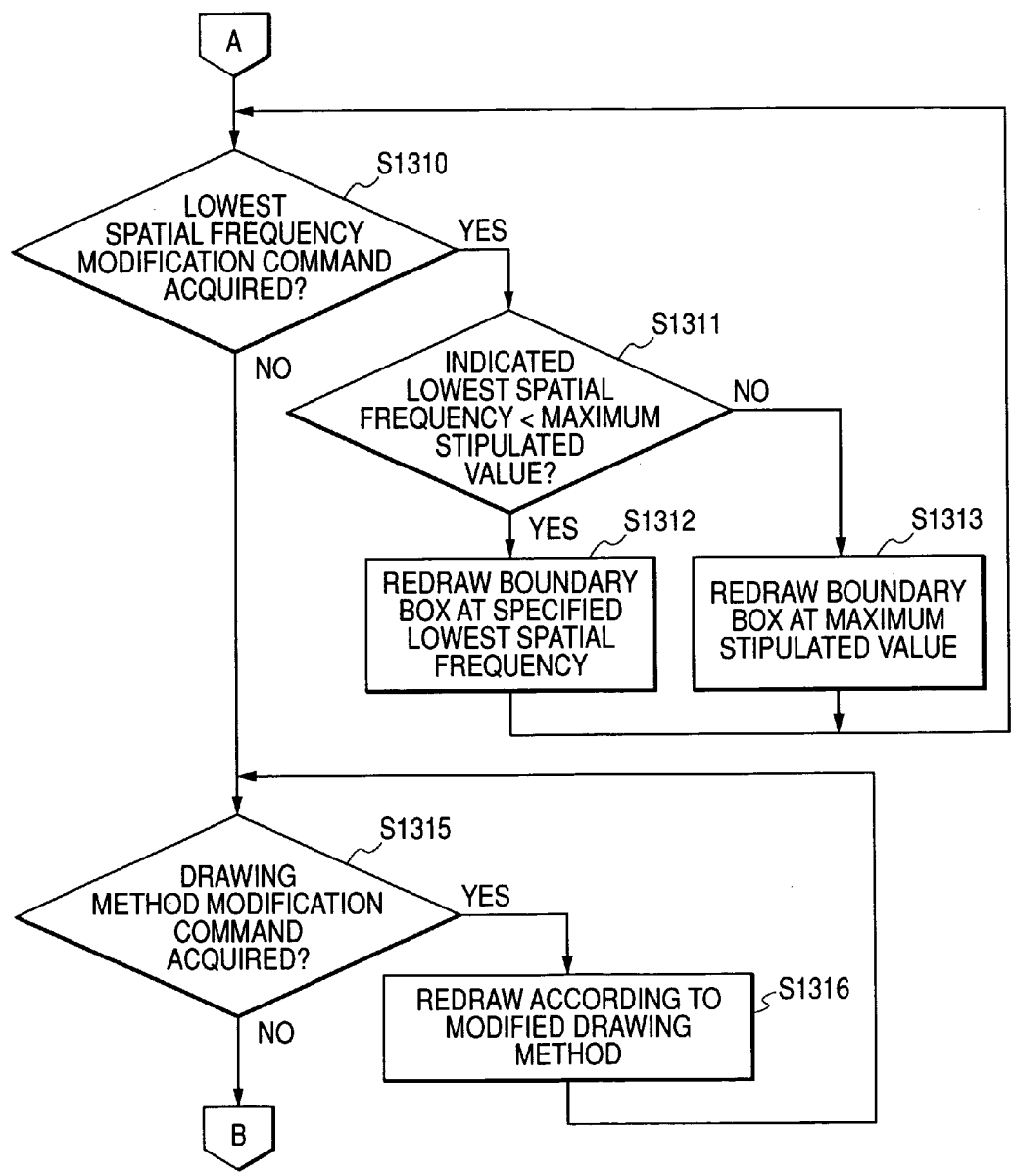
FIG. 16 is a flowchart to show processing following the processing in FIG. 15.

FIG. 16 is a flowchart to show processing following the processing in FIG. 15. If the condition modification command acquisition unit 100 acquires a lowest spatial frequency modification command (YES at step S1310), the process proceeds to step S1311. If the user enters the lowest spatial frequency (β) in the boundary box operation screen shown in FIG. 10, the condition modification command acquisition unit 100 acquires the lowest spatial frequency modification command containing the entry.

If the lowest spatial frequency (β) indicated in the lowest spatial frequency modification command is smaller than the maximum stipulated value (βmax) (YES at step S1311), the boundary box processing unit 116 redraws the boundary box 40 at the lowest spatial frequency (β) indicated in the lowest spatial frequency modification command (step S1312). Here, the maximum stipulated value (βmax) refers to the maximum spatial frequency that can be represented by the parameter of the three-dimensional image display device.

On the other hand, if the lowest spatial frequency (β) indicated in the lowest spatial frequency modification command is larger than the maximum stipulated value (βmax) (NO at step S1311), the boundary box processing unit 116 redraws the boundary box 40 at the maximum stipulated value (βmax) (step S1313).

In the embodiment, the default value of the lowest spatial frequency (β) in drawing the boundary box 40 is 320 cpr. If the value is modified, the boundary box 40 is redrawn.

More specifically, the near-side limit 42 and the far-side display limit 44 are again calculated. The boundary box 40 is redrawn accordingly. That is, when the lowest spatial frequency (β) is large, the absolute values of both the near-side limit 42 and the far-side display limit 44 decrease. When β is small, the absolute values of both the near-side limit 42 and the far-side display limit 44 increase.

However, the maximum spatial frequency that can be represented by the parameter of the three-dimensional image display device, namely, the maximum stipulated value (βmax) is determined. The maximum stipulated value (βmax) is defined according to the following Expression (6). The maximum stipulated value (βmax) is described in detail in the reference R1.

$$\beta max = L/(2*psp*Np) \quad (6)$$

If a larger value than the maximum stipulated value (βmax) is specified as the lowest spatial frequency (β), the boundary box 40 at the maximum stipulated value (βmax) is redrawn. For example, the maximum stipulated value (βmax) is calculated as 434.8 cpr under the condition stored in the default parameter storage unit 112. The boundary box drawing condition when the lowest spatial frequency (β) is set to 320 cpr is that the near-side limit and the far-side display limit be 20.3 mm and −21.7 mm respectively as described above.

In contrast, if the lowest spatial frequency (β) is modified to 400 cpr, the near-side limit and the far-side display limit become 16.3 mm and −17.3 mm respectively. That is, the boundary box 40 having the whole depth of 33.6 mm is redrawn. This means that the area in which 400-cpr object can be displayed becomes narrow as compared with the area in which 320-cpr object can be displayed.

Next, the process proceeds to step S1315. If the condition modification command acquisition unit 100 acquires a drawing method modification command in response to entry of the user (YES at step S1315), the drawing method setting unit 120 modifies the drawing method in accordance with the drawing method modification command, and the generation screen display unit 118 displays the object 30, the boundary box 40, etc., redrawn according to the modified drawing method on the two-dimensional image display panel 21 (step S1316).

Specifically, the line color and thickness indicating the boundary of the boundary box 40 can be modified in response to entry of the user. The boundary surface of the boundary box 40 can be made translucent. Color modification of the camera center vector 32, drawing thickness modification, etc., can be made.

Figure 17:
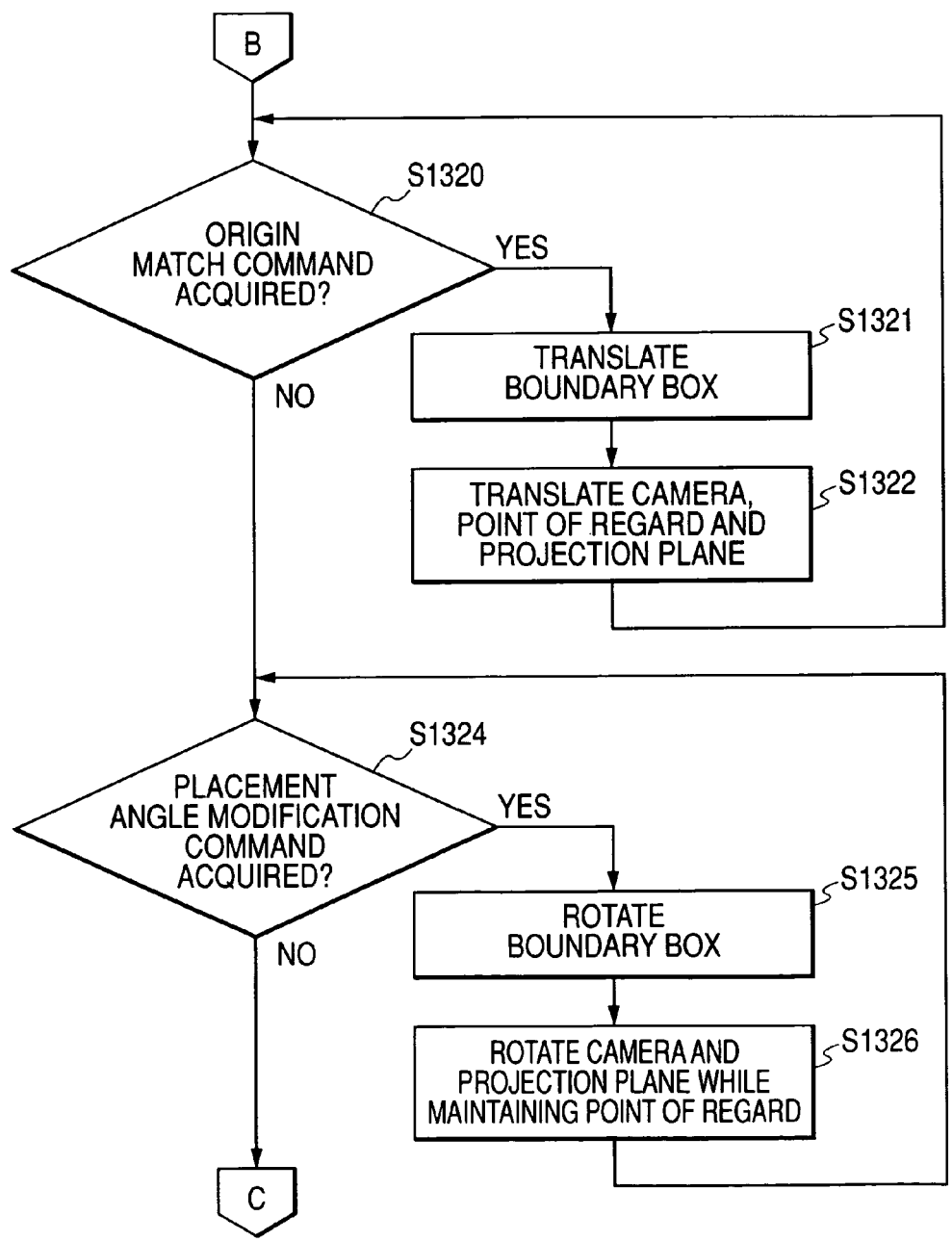
FIG. 17 is a flowchart to show processing following the processing in FIG. 16.

FIG. 17 is a flowchart to show processing following the processing in FIG. 16. If the condition modification command acquisition unit 100 acquires an origin match command (YES at step S1320), the process proceeds to step S1321.

The origin match command is a command for matching the origin of the boundary box 40 and the origin when the object 30 is displayed with each other. The origin of the boundary box 40 is the center point of the horizontal section 41. In FIG. 3, the origin of the boundary box 40 matches the center of each view screen. The origin when the object 30 is displayed is the center position in the three-dimensional image containing the object 30.

The boundary box processing unit 116 translates the boundary box 40 (step S1321). Further, the camera control unit 122 translates the camera array 50 in agreement with the translated boundary box 40 (step S1322).

To adjust the reproduce position of the object 30, the user (creator) may want to match the origin of the boundary box 40 and the origin when the object 30 is displayed with each other. To match the origin of the boundary box 40 and the origin of the object 30 with each other, the boundary box 40 may be translated or the object 30 may be translated.

However, often the calculation amount of translation of the boundary box 40 is smaller than that of the object 30. Then, in the embodiment, the boundary box 40 is translated.

In addition, if the user enters the translation distance of the boundary box 40 in each direction in the boundary box operation screen shown in FIG. 10, the condition modification command acquisition unit 100 acquires the placement position of the boundary box 40, namely, modification of the placement position of the object 30 in a three-dimensionally displayable area. In this case, the boundary box processing unit 116 translates the boundary box 40 to the position indicated in the placement position modification command. Further, the camera control unit 122 translates the camera array 50 as the boundary box 40 is translated, and also translates the point of regard and the projection plane containing the point of regard.

As another example, the user may enter a modification command of the placement position of the object 30 or the boundary box 40 while seeing the generation screen shown in FIG. 3. In this case, the condition modification command acquisition unit 100 acquires the user-entered placement position modification command. The boundary box processing unit 116 redraws the boundary box 40 in accordance with the placement position modification command. That is, the placement position of the boundary box 40 based on the placement position of the object 30 is modified in accordance with the placement position modification command as the object 30 displayed on the three-dimensional image display device 20 is fixed.

Thus, if the placement position modification command of the object 30 is entered, the placement position of the boundary box 40 relative to the object 30 is modified so as to conform to the placement position modification of the object 30.

Next, the process proceeds to step S1324 and if the condition modification command acquisition unit 100 acquires a placement angle modification command (YES at step S1324), the process proceeds to step S1325. If the user enters the shift angle from the normal as the basic setting in the boundary box operation screen shown in FIG. 10, the condition modification command acquisition unit 100 acquires the placement angle modification command containing the entry.

When the condition modification command acquisition unit 100 acquires the placement angle modification command, the relative angle between the upper vector of the boundary box 40 and the upper vector when the object 30 is displayed is modified in response to the angle indicated in the placement angle modification command. That is, the upper vector of the boundary box 40 and the upper vector when the object 30 is displayed are matched with each other.

Specifically, the boundary box processing unit 116 rotates the boundary box 40 displayed on the three-dimensional image display device 20 in response to the angle indicated in the placement angle modification command (step S1325). Further, the camera control unit 122 rotates the camera array 50 in response to the rotation of the boundary box 40 (step S1326). To rotate the boundary box 40, the point of regard at the face center of the horizontal section 41 is adopted as the origin.

Figure 18:
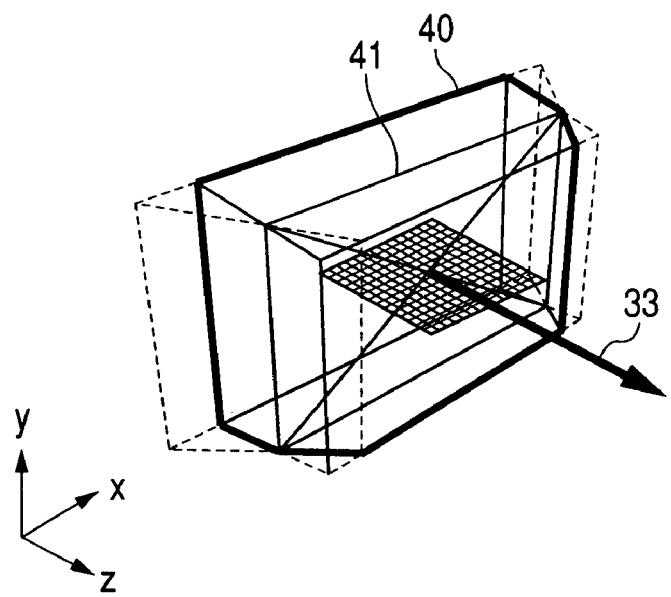
FIG. 18 is a drawing that shows the boundary box 40 for the three-dimensional image display device of upright orientation.
Figure 19:
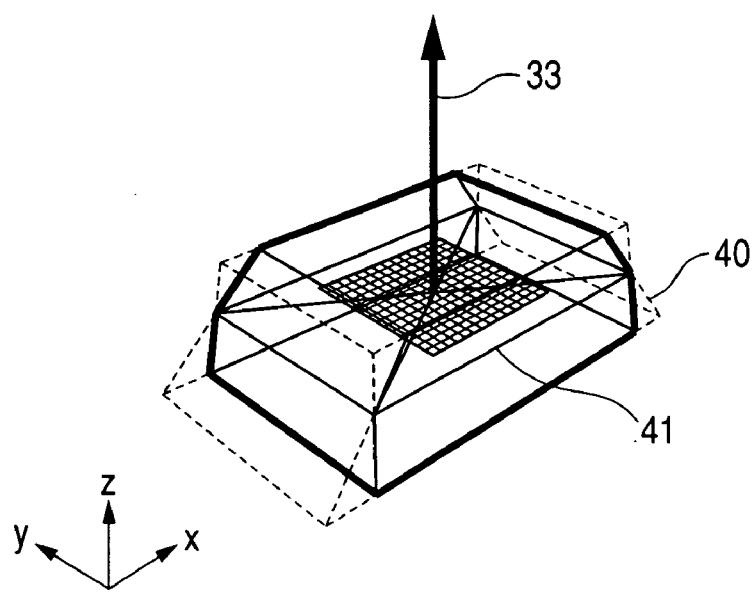
FIG. 19 is a drawing that shows the boundary box 40 for the three-dimensional image display device of flat orientation.

FIG. 18 is a drawing that shows the boundary box 40 for the three-dimensional image display device of upright orientation. An upper vector 33 is directed roughly in the horizontal direction. FIG. 19 is a drawing that shows the boundary box 40 for the three-dimensional image display device of flat orientation. The upper vector 33 is directed roughly in the vertical direction. For example, if the upright orientation is modified to the flat orientation, the upper vector 33 rotates 90 degrees. The angle may be modified in response to the elevation angle when the three-dimensional image display device is placed in the flat orientation. In the embodiment, the xy plane is fixed to the display surface and the coordinates does not mean the absolute coordinates.

In addition, the condition modification command acquisition unit 100 acquires a placement angle modification command indicating modification of the placement angle when the object 30 is displayed on the three-dimensional image display device 20 in response to the user's entry. In this case, the boundary box processing unit 116 rotates the boundary box 40 by the rotation angle indicated in the placement angle modification command. Further, the camera control unit 122 rotates the camera array 50.

The user may enter a modification command of the front position of the object 30, namely, a modification command of the placement angle of the object 30 while seeing the generation screen shown in FIG. 3 as with the translation of the boundary box 40.

In this case, the condition modification command acquisition unit 100 acquires the user-entered placement angle modification command indicating modification of the placement angle of the object 30. The boundary box processing unit 116 redraws the boundary box 40 rather than the object 30 in accordance with the placement angle modification command of the object 30. That is, the boundary box 40 is rotated as the object 30 displayed on the three-dimensional image display device 20 is fixed. The camera array 50 is rotated as the boundary box 40 is rotated.

Figure 20:
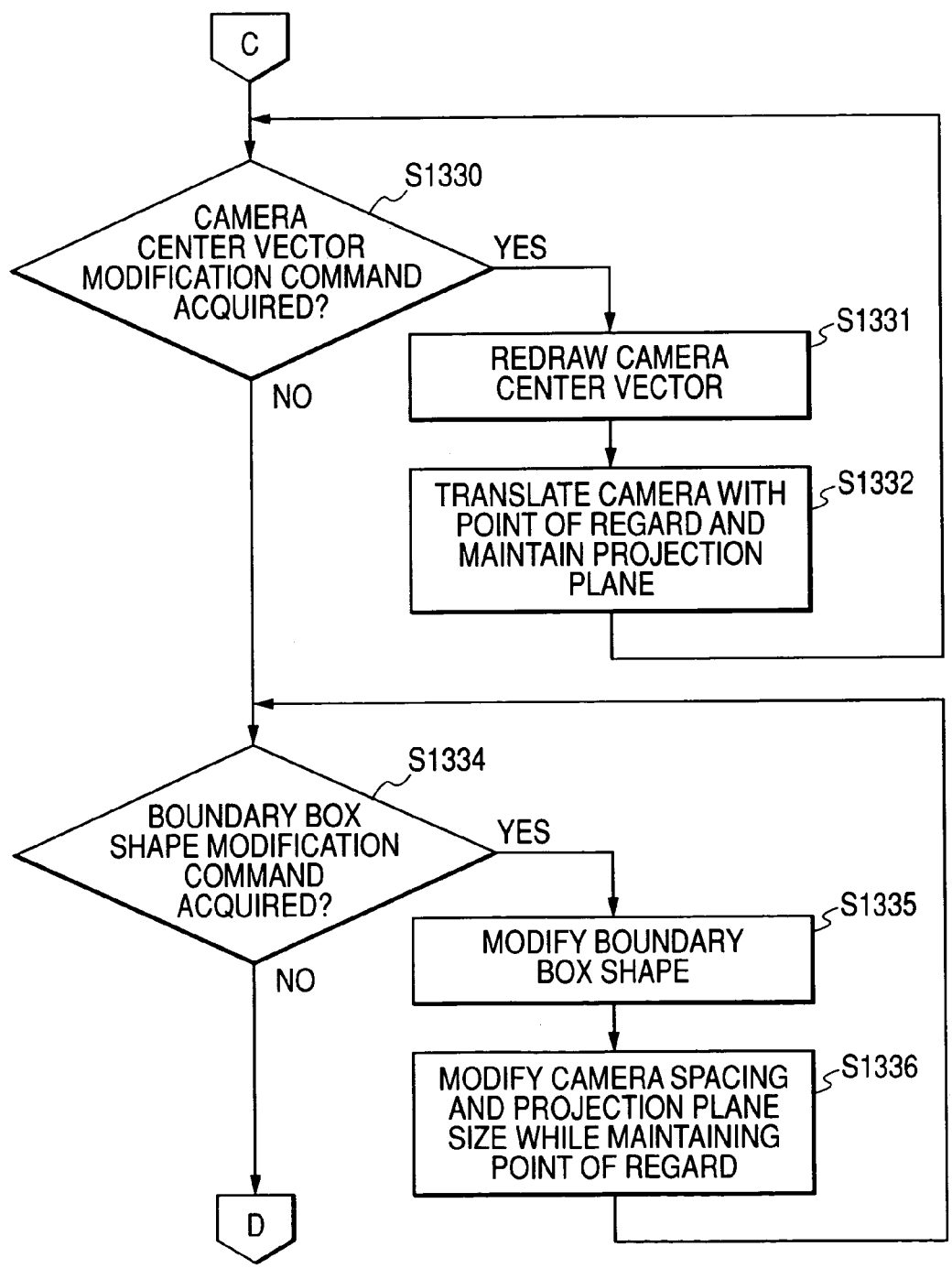
FIG. 20 is a flowchart to show processing following the processing in FIG. 17.

FIG. 20 is a flowchart to show processing following the processing in FIG. 17. If the condition modification command acquisition unit 100 acquires a camera center vector modification command indicating modification of the camera center vector 32 (YES at step S1330), the boundary box processing unit 116 modifies the direction of the camera center vector 32 and redraws the modified camera center vector 32 (step S1331).

Next, the camera control unit 122 translates the camera array 50 based on the redrawn camera center vector 32 (step S1332). The processing described in FIG. 20 differs from the processing previously described with reference to FIG. 17 in that the flat plane containing the point of regard maintains the relation of the center vector as the normal in the processing described in FIG. 17; whereas, the center vector does not become parallel in the normal direction to the flat plane containing the point of regard in the processing described in FIG. 20. If the normal direction of the three-dimensional image display device 20 and the observation direction do not match, the processing can be performed for matching both the directions with each other.

Next, the process proceeds to step S1334 and if the condition modification command acquisition unit 100 acquires a shape modification command indicating modification of the shape of the boundary box 40 (YES at step S1334), the boundary box 40 is redrawn in accordance with the shape modification command (step S1335). Specifically, anisotropic scaling up and down along the x, y, and z axes and isotropic scaling up and down with the boundary box shape maintained are included. If the user enters the values of the boundary box shape in the boundary box operation screen shown in FIG. 10, the condition modification command acquisition unit 100 acquires the shape modification command containing the entry. Next, the camera control unit 122 modifies the camera spacing and the projection plane size based on the redrawn boundary box 40 (step S1336).

As described above, in the multi-viewpoint image generation interface 10 according to the embodiment, not only the object 30, but also the boundary box 40 is displayed on the three-dimensional image display device 20 and a multi-viewpoint image is generated while the shape and the position of the boundary box 40 is modified, as previously described with reference to FIG. 3.

Figure 21:
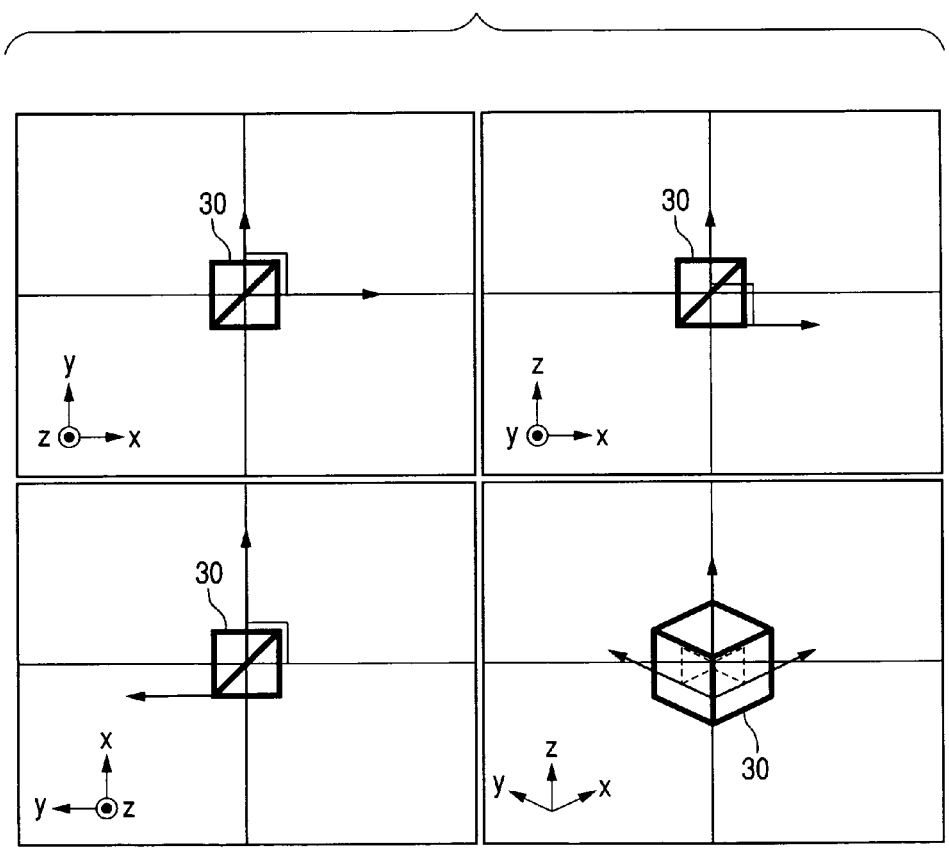
FIG. 21 is a drawing that shows a display screen example displaying object 30 as a simple CG model.

FIG. 21 is a drawing that shows a display screen example displaying the object 30 as a simple CG model. The display screen contains a top view, a front view, a left view, and a perspective view. It is difficult for the user to set the arrangement (placement position) of the camera array 50 for reproducing the object 30 on the three-dimensional image display device in any desired view manner while seeing the screen; it is disadvantageous particularly for a novice user.

In contrast, if the boundary box 40 is displayed together with the object 30 as shown in FIG. 3, the relative relation between the object 30 and the boundary box 40 can be figured out, thus leading to aid in intuitive figure out of the shape of the object 30 at the reproduce time thereof. Further, as the boundary box 40 is operated, the shape of the object 30 at the reproduce time thereof can be controlled, so that any desired object 30 can be generated easily.

Further, when the boundary box 40 is redrawn, the camera control unit 122 calculates the camera spacing and again lays out the camera array 50. That is, if the user is operates the boundary box 40, the camera array 50 is automatically arranged. Therefore, even if the user does not keep track of the relationship between the arrangement of the camera array 50 and the shape of the object 30 at the reproduce time thereof, the user can perform operation to obtain a three-dimensional image 31 as shown in FIG. 23B by intuition without concern for the camera array 50.

The relationship between operation of the boundary box 40 and the shape of the object 30 at the reproduce time thereof on the three-dimensional image display device 20 determined by operating the boundary box 40 will be discussed with reference to FIGS. 22A-25B.

Figure 22A:
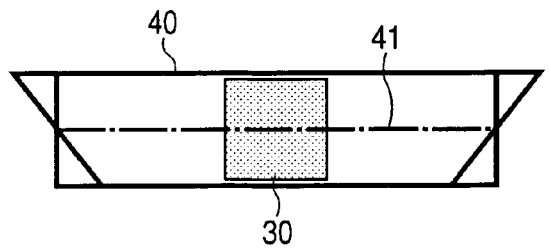
FIG. 22A is a drawing that shows the horizontal section 41 of the two-dimensional image display panel 21, the boundary box 40, and the object 30 of a CG model.
Figure 22B:
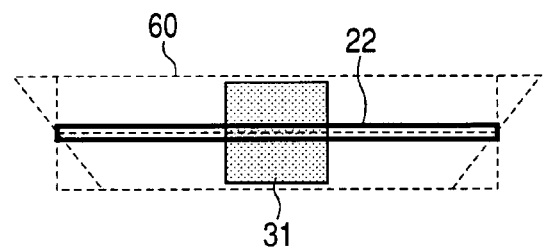
FIG. 22B is a drawing that shows a horizontal section 22 of the three-dimensional image display device 20, a playable area 60 of the three-dimensional image display device 20, and a three-dimensional image 31 of the object 30 reproduced on the three-dimensional image display device 20.

FIG. 22A is a drawing that shows the horizontal section 41 of the two-dimensional image display panel 21, the boundary box 40, and the object 30 of a CG model. FIG. 22B is a drawing that shows a horizontal section 22 of the three-dimensional image display device 20, a playable area 60 of the three-dimensional image display device 20, and the three-dimensional image 31 of the object 30 reproduced on the three-dimensional image display device 20. The three-dimensional image 31 is an image reproduced based on the multi-viewpoint image acquired from the camera array 50 arranged so as to satisfy the relative relation between the boundary box 40 and the object 30 shown in FIG. 22A.

When the specifications of the three-dimensional image display device 20 are determined, the playable area 60 is fixed accordingly. The shapes of the playable area 60 and the boundary box 40 match completely. This is equivalent to the match between the conditions of the capturing and reproduce systems. Consequently, the object 30 is reproduced on the three-dimensional image display device 20 as the three-dimensional image 31 of the object 30 with the correct shape and size.

Figure 23A:
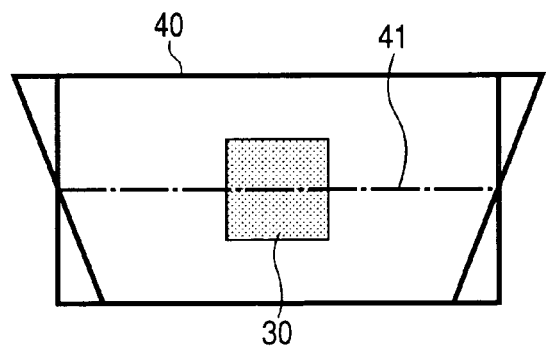
FIG. 23A is a drawing that shows the state in which the width in the depth direction (z direction) of the boundary box 40 is expanded twice relative to the object 30 from the state shown in FIG. 22A.
Figure 23B:
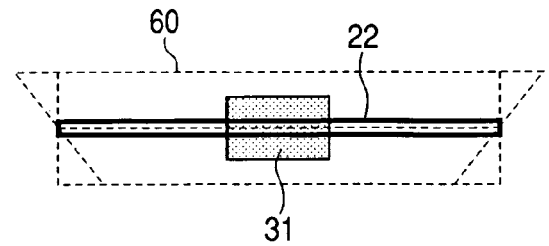
FIG. 23B is a drawing that shows the three-dimensional image 31 reproduced based on the multi-viewpoint image acquired from the camera array 50 arranged so as to satisfy the relative relation between the boundary box 40 and the object 30 shown in FIG. 23A.

FIG. 23A is a drawing that shows the state in which the width in the depth direction (z direction) of the boundary box 40 is expanded by twice relative to the object 30 from the state shown in FIG. 22A. FIG. 23B is a drawing that shows the three-dimensional image 31 reproduced based on the multi-viewpoint image acquired from the camera array 50 arranged so as to satisfy the relative relation between the boundary box 40 and the object 30 shown in FIG. 23A.

The three-dimensional image 31 is reproduced in a shape shrunk to a half in the z direction from the state shown in FIG. 22B, as shown in FIG. 23B. Since the size of the playable area 60 is fixed as described above, the three-dimensional image 31 is thus deformed.

If the camera spacing of the camera array 50 is narrowed, the played-back three-dimensional image becomes thin in the z direction. In an extreme example, if the camera spacing is set to zero, the played-back three-dimensional image has a thickness of zero. That is, it becomes a two-dimensional image. The details of the above is described in the reference R2.

That is, if the width in the z direction is modified by n times in FIG. 23A from the state shown in FIG. 22A, the camera spacing of the camera array is modified by n times relative to the design of the reproduce system. Accordingly, such a multi-viewpoint image to reproduce the three-dimensional image 31 as shown in FIG. 23B is generated.

Figure 24A:
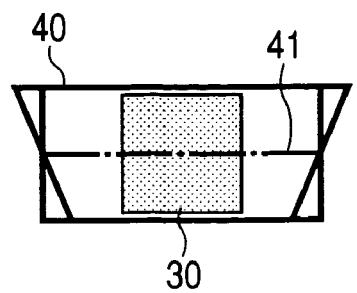
FIG. 24A is a drawing that shows the state in which the width in the horizontal direction (x direction) of the boundary box 40 is reduced to a half relative to the object 30 from the state shown in FIG. 22A.
Figure 24B:
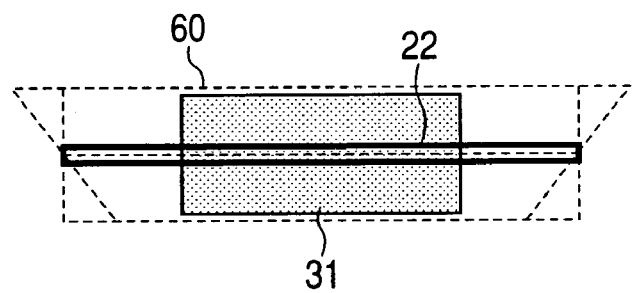
FIG. 24B is a drawing that shows the three-dimensional image 31 reproduced based on the multi-viewpoint image acquired from the camera array 50 arranged so as to satisfy the relative relation between the boundary box 40 and the object 30 shown in FIG. 24A.

FIG. 24A is a drawing that shows the state in which the width in the horizontal direction (x direction) of the boundary box 40 and the width in the vertical direction (not shown) are reduced to a half relative to the object 30 from the state shown in FIG. 22A. FIG. 24B is a drawing that shows the three-dimensional image 31 reproduced based on the multi-viewpoint image acquired from the camera array 50 arranged so as to satisfy the relative relation between the boundary box 40 and the object 30 shown in FIG. 24A.

Thus, the three-dimensional image 31 is reproduced in a shape expanded by twice in the x direction and in the y direction (not shown) from the state shown in FIG. 22B. If the widths in the x and y directions of the boundary box 40 are enlarged by a scale factor of "m", as shown in FIG. 24A, the camera control unit 122 sets the camera spacing of the camera array to m times and the projection plane size to $(1/m)^2$ ($(1/m)$ times in the horizontal direction and $(1/m)$ times in the vertical direction).

Figure 25A:
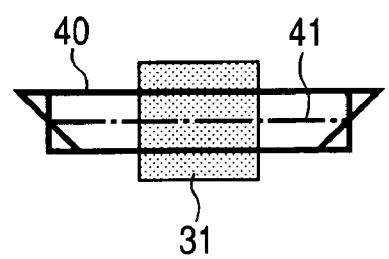
FIG. 25A is a drawing that shows the state in which the boundary box 40 is isotropically scaled down relative to the object 30 from the state shown in FIG. 22A.
Figure 25B:
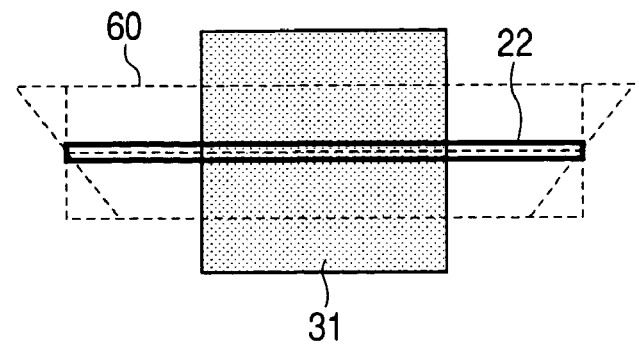
FIG. 25B is a drawing that shows the three-dimensional image 31 reproduced based on the multi-viewpoint image acquired from the camera array 50 arranged so as to satisfy the relative relation between the boundary box 40 and the object 30 shown in FIG. 25A.

FIG. 25A is a drawing that shows the state in which the boundary box 40 is isotropically scaled down relative to the object 30 from the state shown in FIG. 22A. FIG. 25B is a drawing that shows the three-dimensional image 31 reproduced based on the multi-viewpoint image acquired from the camera array 50 arranged so as to satisfy the relative relation between the boundary box 40 and the object 30 shown in FIG. 25A.

Thus, the three-dimensional image 31 can be isotropically scaled up from the state shown in FIG. 22B. This is operation equivalent to zooming of a two-dimensional image. If the boundary box 40 is isotropically multiplied by "n" as shown in FIG. 25A, the camera control unit 122 sets the projection plane size of the camera array to $(1/n)^2$ ($(1/n)$ times in the horizontal direction and $(1/n)$ times in the vertical direction).

More specifically, for example, assume that the boundary box is isotropically scaled down to a half on the three-dimensional image display device 20 according to the embodiment. In this case, the horizontal projection plane size of the camera array is modified from 331.2 mm in width×207.0 mm in height to a half, namely, 165.6 mm in width×103.5 mm in height. The point of regard is maintained. Consequently, the played-back three-dimensional image is scaled up twice the object 30 for display.

Assume that the boundary box is scaled up by two (=z) times only in the z direction. In this case, the camera spacing of the camera array is reduced to a half (13.4 [mm]=psp*L/g/z) with the camera center intact in response to the scaling up of the boundary box. Consequently, the played-back model is shrunk to a half thickness in the z direction.

If the boundary box is scaled up by two (=x) times in the x and y directions, the camera spacing of the camera array is scaled up by twice (53.5 [mm]=psp*L/g/x) with the camera center intact. Further, the horizontal projection plane size of the camera array is modified from 331.2 mm in width and 207.0 mm in height to twice, namely, 662.4 mm in width and 414.0 mm in height. The point of regard is maintained. Consequently, the played-back three-dimensional image is scaled down by ½ times the model in the x direction for display.

As described above, the boundary box 40 displayed on the three-dimensional image display device 20 is operated, whereby the object 30 can be displayed in any desired size, in any desired thickness, and at any desired angle.

Such operation can also be accomplished by scaling up, crushing, or rotating the object 30. However, the information amount of the object 30 is large as compared with that of the boundary box 40. Therefore, the boundary box 40 is operated. Accordingly, the interface operating more lightly can be implemented.

Figure 26:
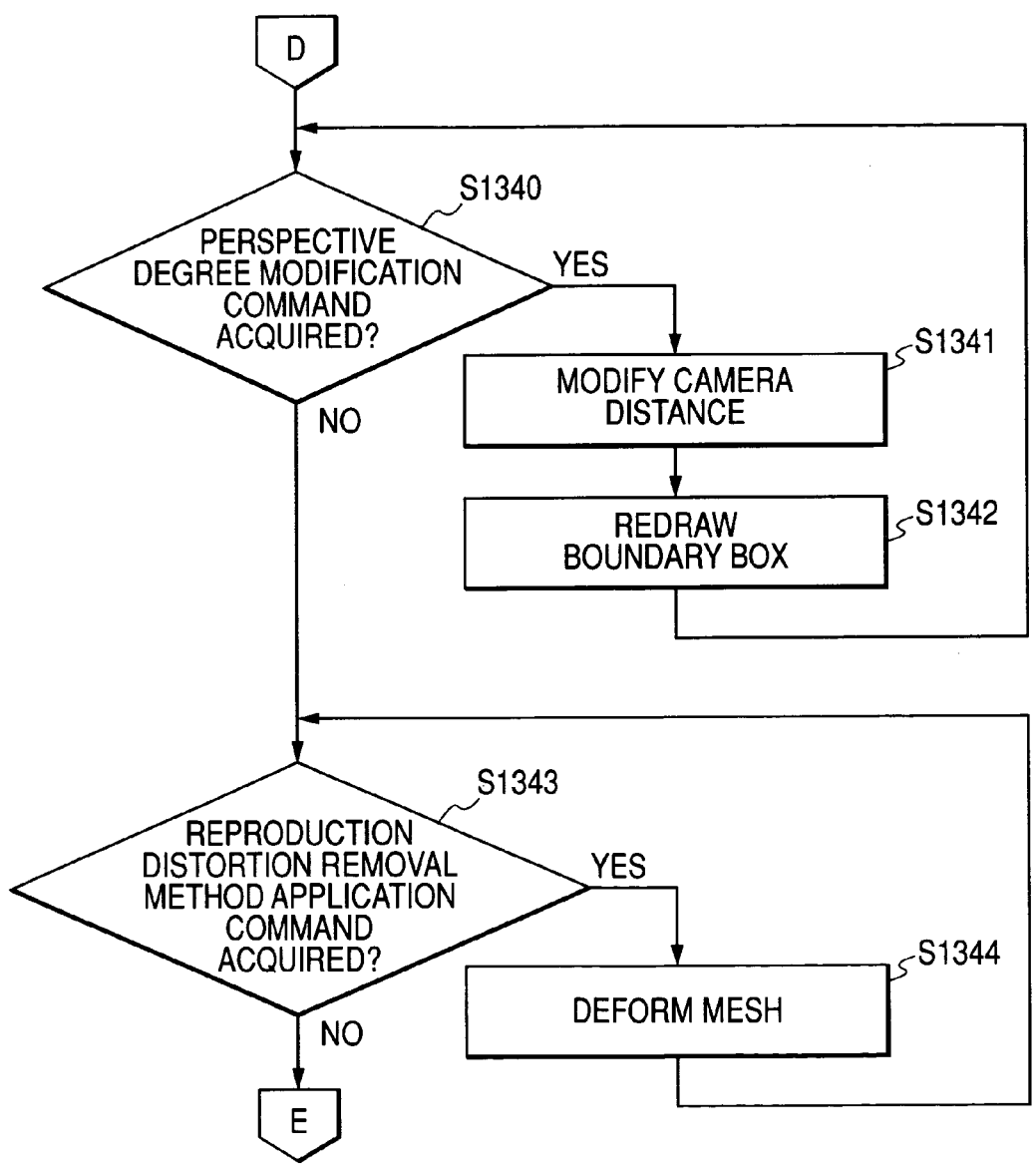
FIG. 26 is a flowchart to show processing following the processing in FIG. 20.

FIG. 26 is a flowchart to show processing following the processing in FIG. 20. If the condition modification command acquisition unit 100 acquires a perspective degree modification command (YES at step S1340), the process proceeds to step S1341. If the user enters the value of "CAMERA DISTANCE/VIEWING DISTANCE" in the projection method setting screen shown in FIG. 11, the condition modification command acquisition unit 100 acquires the perspective degree modification command containing the entry. The user can make slider and multiple numeric value entry in the projection method setting screen shown in FIG. 11. The camera distance refers to the length of the normal dropped from the center camera of the center of the camera array to the projection plane.

The camera control unit 122 modifies the camera distance based on the perspective degree modification command. That is, the camera control unit 122 modifies the arrangement of the camera array 50 (step S1341). Specifically, if the camera distance (L') is made shorter than the observation reference viewing distance (L), an image lower in the perspective degree (close to the parallel projection method) is reproduced. Further, the boundary box 40 is redrawn in response to the modification of the camera distance (step S1342).

It should be noted that the observation reference viewing distance (L) assumed to be the observation position of the observer and the camera distance (L') are set separately. The numbers of cameras is determined so that the maximum viewing zone is provided based on the position of the observation reference viewing distance. That is, if the observation reference viewing distance varies, the image is not modified and what distance the maximum viewing zone width is provided at only modifies.

In contrast, the camera distance is for determining what position the parallax information to reproduce a three-dimensional image is acquired from, and for determining what information is superposed on the locus of a light ray bearing the parallax information determined by hardware. That is, if the camera distance is varied, the three-dimensional image viewed by the observer modifies. However, the observer observes from the observation reference viewing distance and therefore the preview screen described later needs to be acquired from the observation reference viewing distance.

As described above, the user can obtain a three-dimensional image in any desired perspective degree without concern for the camera distance by entering the numeric value in the projection method setting screen. Modification of the inclination of the side of the boundary box (determined by the capturing range of the outmost two cameras) can cause the user to figure out the perspective degree by intuition. The detail is described in the reference R2.

If the condition modification command acquisition unit 100 acquires a reproduce distortion removal application command (YES at step S1343), the mesh deformation unit 124 executes mesh deformation (step S1344). If the user selects reproduce distortion removal application in the projection method setting screen shown in FIG. 11, the condition modification command acquisition unit 100 acquires the reproduce distortion removal application command.

The mesh deformation is as follows: In a three-dimensional image display device of Integral Imaging system (1D-II) for giving parallax only in the horizontal direction, capturing is conducted using camera with perspective projection in the vertical direction and parallel projection in the horizontal direction (vertical perspective horizontal parallel camera), whereby a three-dimensional image with no distortion can be reproduced, as described in the reference R2.

Considering the point, if an attempt is made to reproduce a model with no distortion using a perspective projection camera array of a parallel projection camera array, the object 30 needs to be deformed. That is, to obtain an image as obtained with the vertical perspective horizontal parallel camera from an image obtained using a parallel camera, the width of the shape of the object 30 in the vertical direction (y direction) needs to be narrowed gradually toward the far-side direction along the line connecting the viewpoint and the point of regard (line of sight). Here, the viewpoint refers to the position of the center camera and the point of regard refers to the center point of a three-dimensional image and the center of the projection plane.

Figure 27:
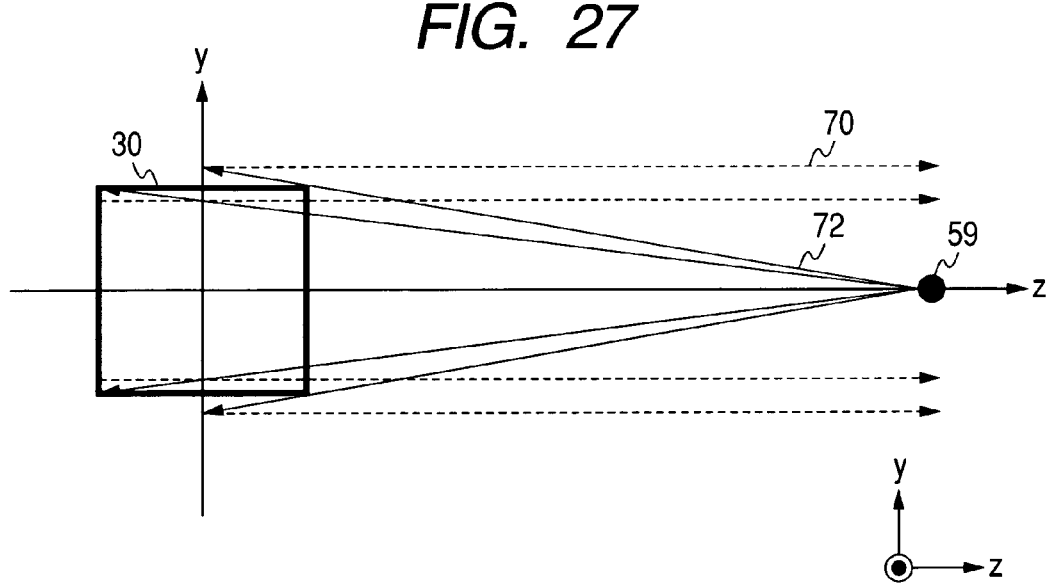
FIG. 27 is a drawing to describe processing of deforming an image obtained using a parallel camera to an image as obtained with a vertical perspective horizontal parallel camera.
Figure 28:
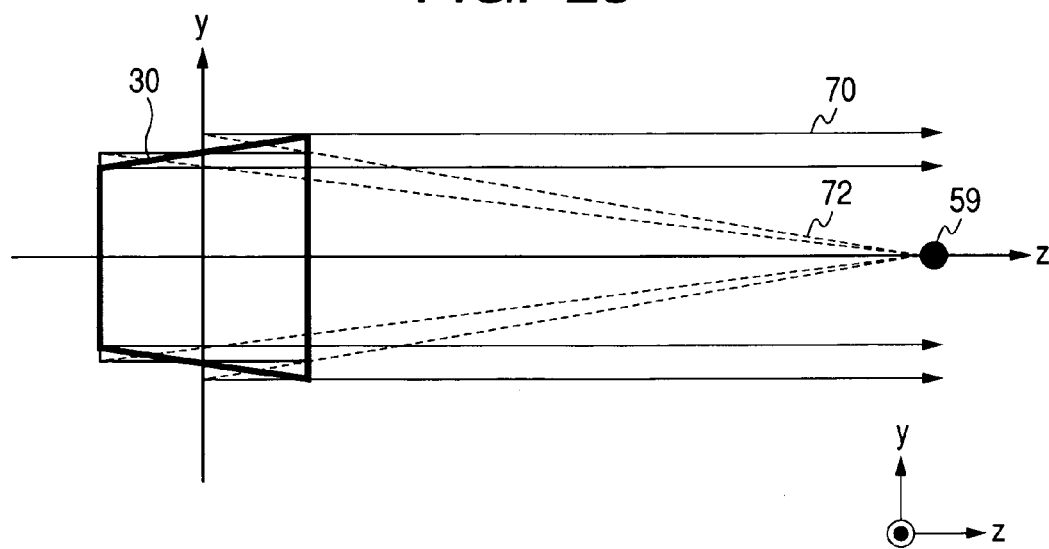
FIG. 28 is a drawing to describe processing of deforming an image obtained using a parallel camera to an image as obtained with a vertical perspective horizontal parallel camera.

FIGS. 27 and 28 are drawings to describe processing of deforming an image obtained using the parallel camera to an image as obtained with the vertical perspective horizontal parallel camera. FIGS. 27 and 28 are yz sectional views of the object 30. As shown in FIG. 27, if the object 30 is captured and reproduced with a parallel light ray 70 from a camera position 59, the plane parallel to the xy plane of the object 30 cannot be represented. Then, the object 30 is deformed so that at the position of the intersection point of a perspective light ray passing through one of apexes forming the object 30 and the xy plane (=projection plane), the apex can be captured. Accordingly, if an image is captured and reproduced with a parallel light ray, it can be reproduced as an image obtained like perspective projection.

That is, deformation may be conducted so that the intersection point of the parallel light ray 70 for capturing and reproduce drawn in the normal direction of the xy plane as shown in FIG. 28 from the capture point on the xy plane (=projection plane) obtained in FIG. 27 and the plane parallel to the projection plane containing one of the apexes forming the object 30 (the xy plane containing the z coordinate of one of the apexes) becomes one of the apexes of the object 30 after the deformation.

In contrast, to obtain an image as obtained with the vertical perspective horizontal parallel camera from an image obtained using a perspective camera, the width of the shape of the object 30 in the horizontal direction (x direction) needs to be narrowed gradually toward the near-side direction along the line of sight.

Figure 29:
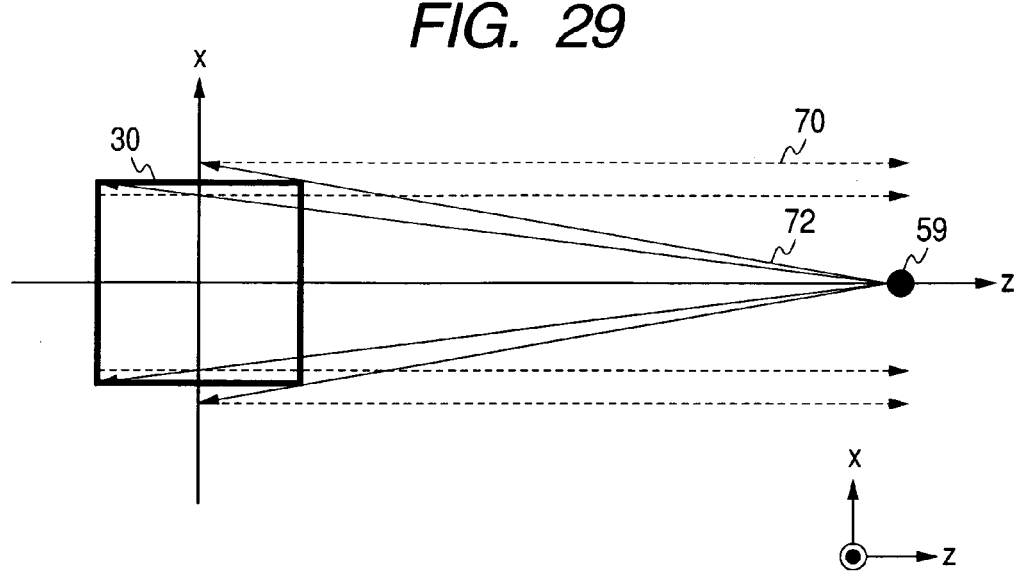
FIG. 29 is a drawing to describe processing of deforming an image obtained using a perspective camera to an image as obtained with a vertical perspective horizontal parallel camera.
Figure 30:
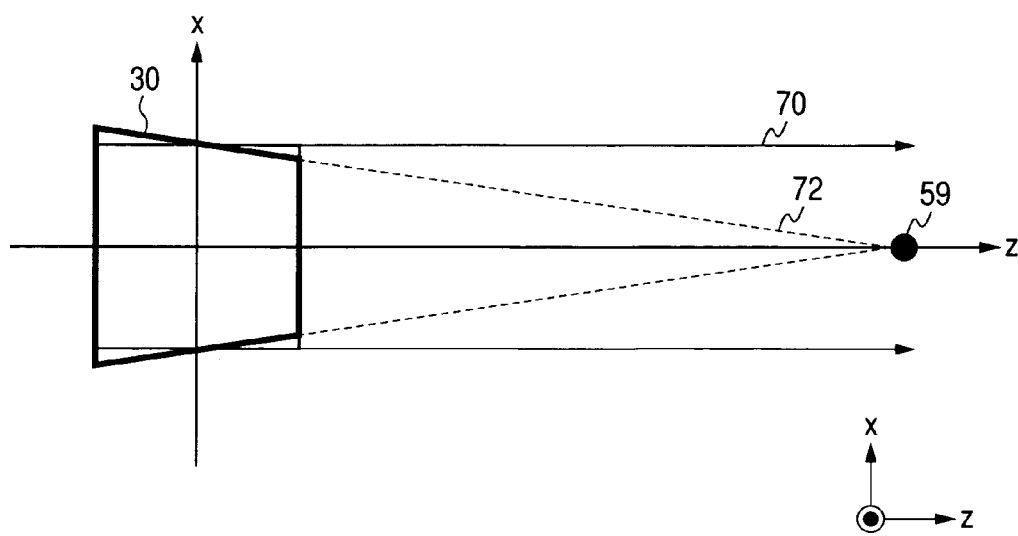
FIG. 30 is a drawing to describe processing of deforming an image obtained using a perspective camera to an image as obtained with a vertical perspective horizontal parallel camera.

FIGS. 29 and 30 are drawings to describe processing of deforming an image obtained using the perspective camera to an image as obtained with the vertical perspective horizontal parallel camera. FIGS. 29 and 30 are xz sectional views of the object 30. As shown in FIG. 29, if an image is acquired with a perspective light ray 72 from a camera position 59 and is reproduced with a parallel light ray 70, the object 30 cannot correctly be reproduced.

In order to correctly reproduce the plane parallel to the yz plane of the object 30 with the parallel light ray 70, the x coordinates may be deformed so that the yz plane of the object 30 becomes parallel to the perspective light ray plane—the perspective light ray plane connecting the camera position 59 and the intersection line of the xy plane (=projection plane) and the plane of the object 30 which is parallel to the yz plane, as shown in FIG. 30. Also at this time, the z coordinate is maintained.

The processing to obtain a vertical perspective horizontal parallel image when each viewpoint image is acquired by perspective projection or parallel projection for the case where the camera center exists in the normal direction relative to the projection plane has been described.

Such deformation can be implemented according to a plurality of techniques including mesh deformation. Preferably, the model is deformed only when an image is acquired with a camera array and the model deformation is reset when the image acquisition is complete. Accordingly, the user can acquire multiple viewpoint images to reproduce the object 30 with no distortion without directly observing the deformation of the object 30.

Figure 31:
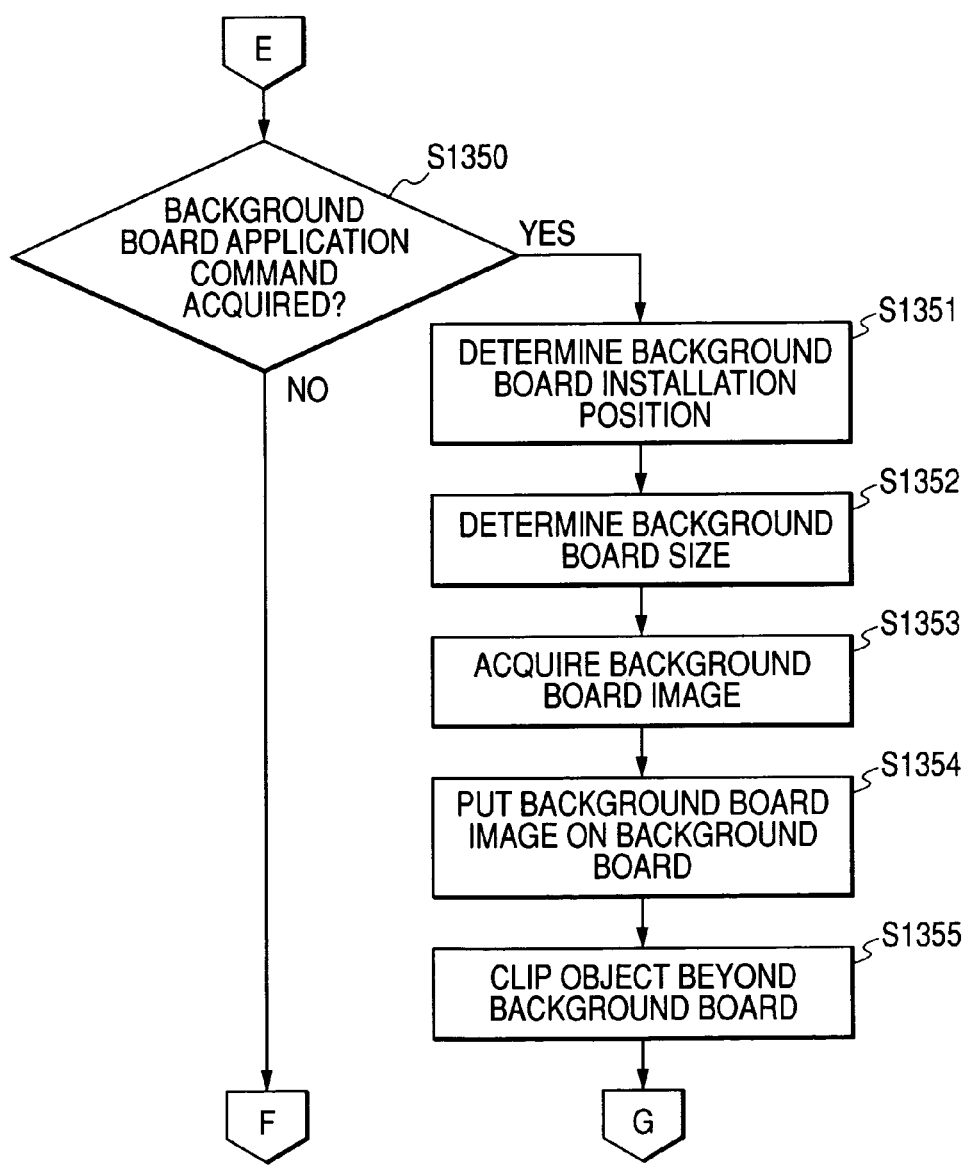
FIG. 31 is a flowchart to show processing following the processing in FIG. 26.

FIG. 31 is a flowchart to show processing following the processing in FIG. 26. If the condition modification command acquisition unit 100 acquires a background board application command (YES at step S1350), the boundary surface processing unit 130 performs background board installation processing (steps S1351 to S1355). If the user selects background board installation in the background board setting screen shown in FIG. 12, the condition modification command acquisition unit 100 acquires the user-entered background board application command.

The three-dimensional image display device 20 for reproducing a multi-viewpoint image generated by the multi-viewpoint image generation interface 10 includes the three-dimensionally displayable area defined by the near-side limit or the far-side display limit. Some object contained in a three-dimensional image may be beyond the displayable area. Then, a background board is installed at the far-side display limit position and object beyond the far-side display limit is displayed as a two-dimensional image, whereby breakdown of the three-dimensional image in the display limit can be circumvented.

Figure 32:
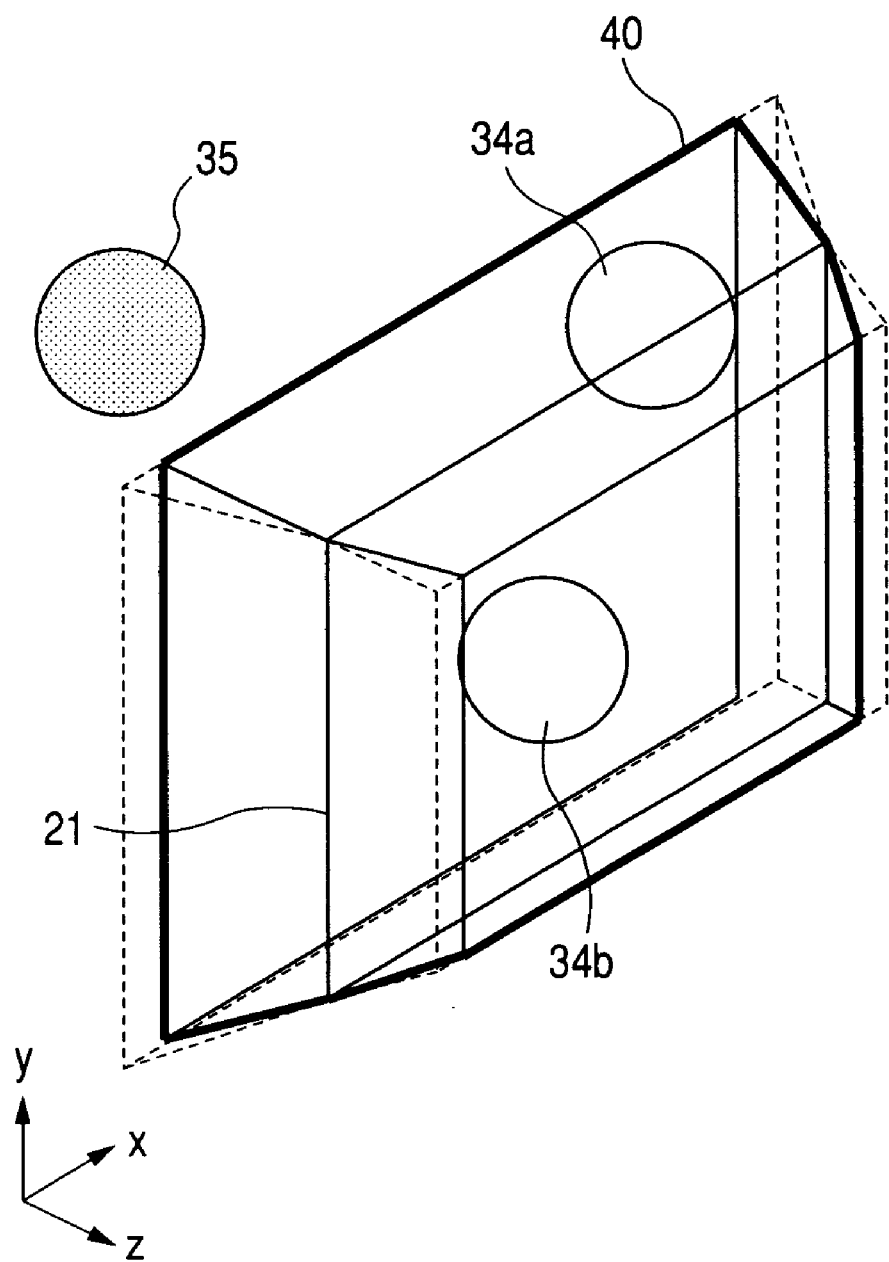
FIG. 32 is a drawing that shows the two-dimensional image display panel 21, the boundary box 40, objects 34a and 34b placed inside the boundary box 40, and object 35 placed outside the boundary box 40.

FIG. 32 is a drawing that shows the two-dimensional image display panel 21, the boundary box 40, objects 34a and 34b placed inside the boundary box 40, and object 35 placed outside the boundary box 40. Since the object 35 is placed outside the display limit, if the object 35 is captured with the camera array and is reproduced by the same factor, an image with poor quality is reproduced.

To solve this problem, a method of scaling up the boundary box 40 in the z direction is also available. However, if the boundary box 40 is scaled up, all objects are shrunk in the z direction for reproduce. Then, importance can be placed on the precision of the three-dimensional display of the objects 34*a* and 34*b* placed inside the boundary box 40 and any other object can be assumed to be a background. The background board is used for this purpose.

Figure 33:
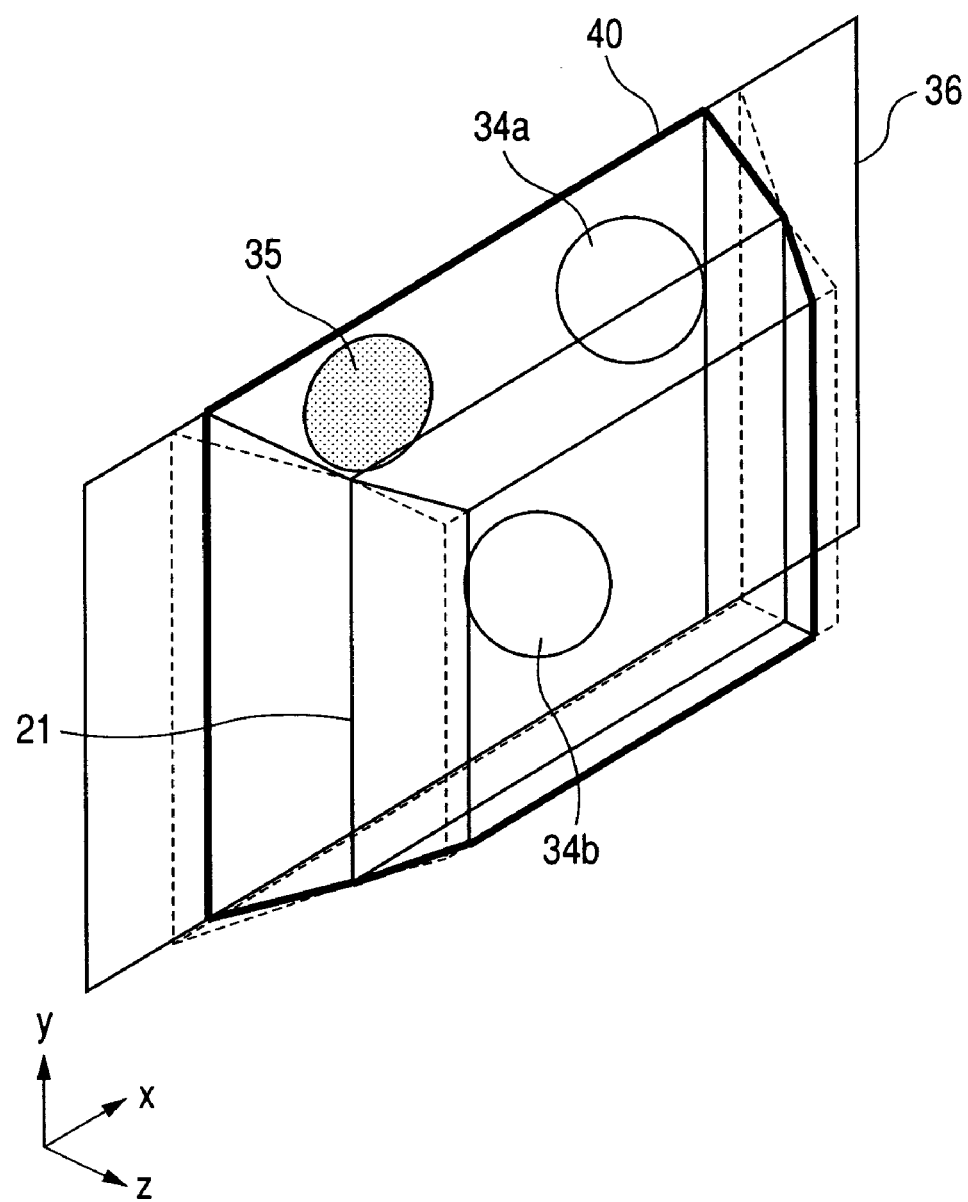
FIG. 33 is a drawing that shows the state in which the object 35 placed outside the boundary box 40 as in FIG. 32 is drawn on a background board 36.

FIG. 33 is a drawing that shows the state in which the object 35 placed outside the boundary box 40 as in FIG. 32 is drawn on a background board 36. The background board 36 is thus installed at the far-side display limit position of the boundary box 40. An image acquired from the center of the camera array 50 is put on the background board 36. In addition to the image, the images to be put on the background board 36 at this time are only images of the objects to be placed beyond the background board 36.

Referring again to FIG. 31, in the background board installation processing, first the background board installation position is determined (step S1351). Next, the background board size is determined (step S1352). Next, a background board image is acquired (step S1353). The background board image may be a two-dimensional image provided by acquiring object beyond the background board from the camera array center or may be a different two-dimensional image not relating to object. Next, the background board image acquired at step S1353 is put on the background board whose installation position and size are determined at steps S1351 and S1352 (step S1354). Next, object beyond the background board is clipped (step S1355). At this time, object with a part put on the background board is left.

Figure 34:
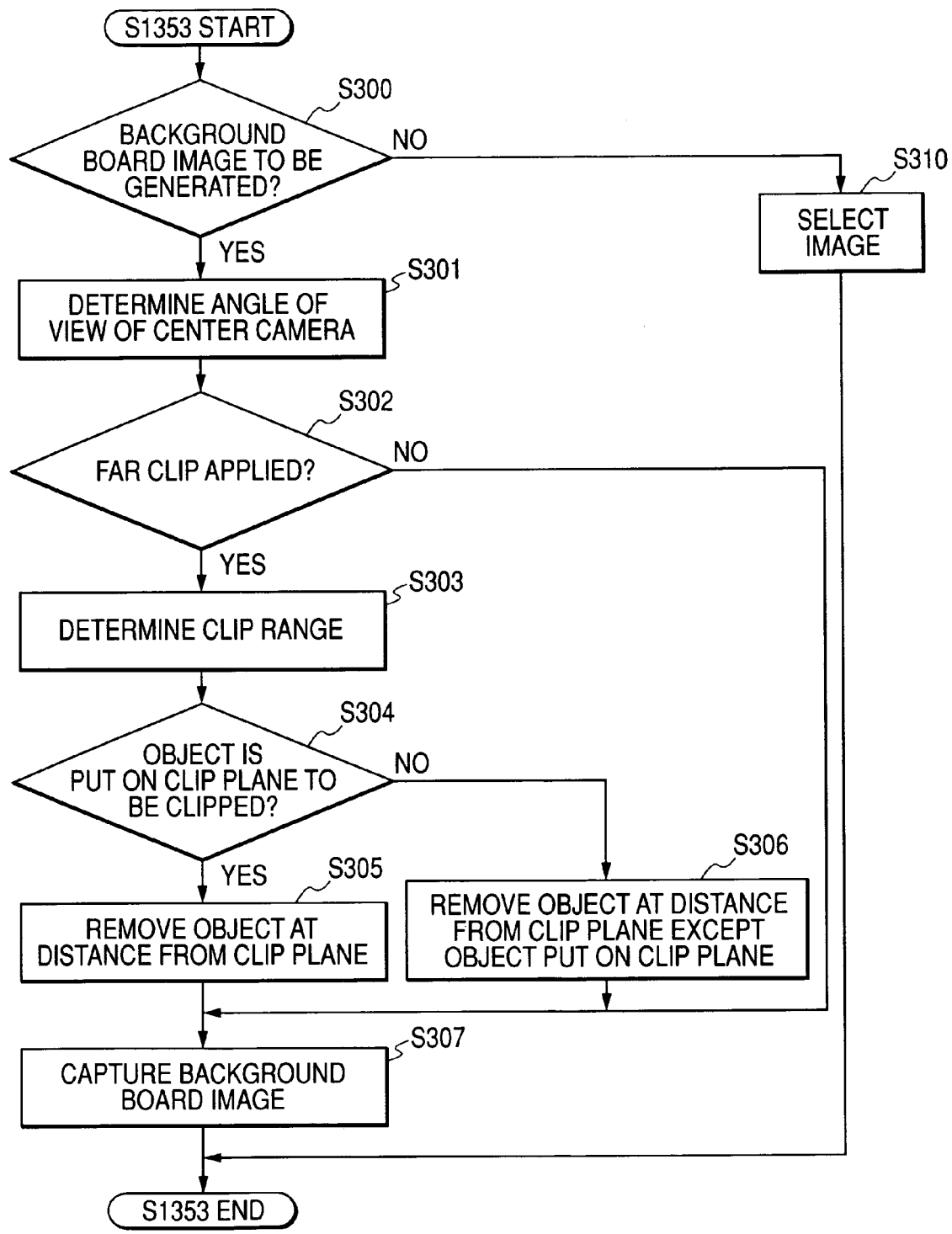
FIG. 34 is a flowchart to show detailed processing of background board image acquisition processing (step S1353) described in FIG. 33.

FIG. 34 is a flowchart to show detailed processing of the background board image acquisition processing (step S1353) described in FIG. 33. To generate a background board image (YES at step S300), the size of the projection plane of the center camera to obtain a background board is determined (step S301).

The size needs to be determined so as to include the capturing range of the outermost two cameras of the camera acquired from the camera array for the object. Accordingly, the object put on the background board is reproduced such that the back from the background board is reproduced as a two-dimensional image and the front is reproduced as a three-dimensional model. Accordingly, it is recognized as continuous information when viewed from the front.

When using another image as the background board image (NO at step S300), an image used as the background board image is selected (step S310).

For clipping for the background board image, near clip (deletion of model in front) may be matched with the background board face.

Figure 35:
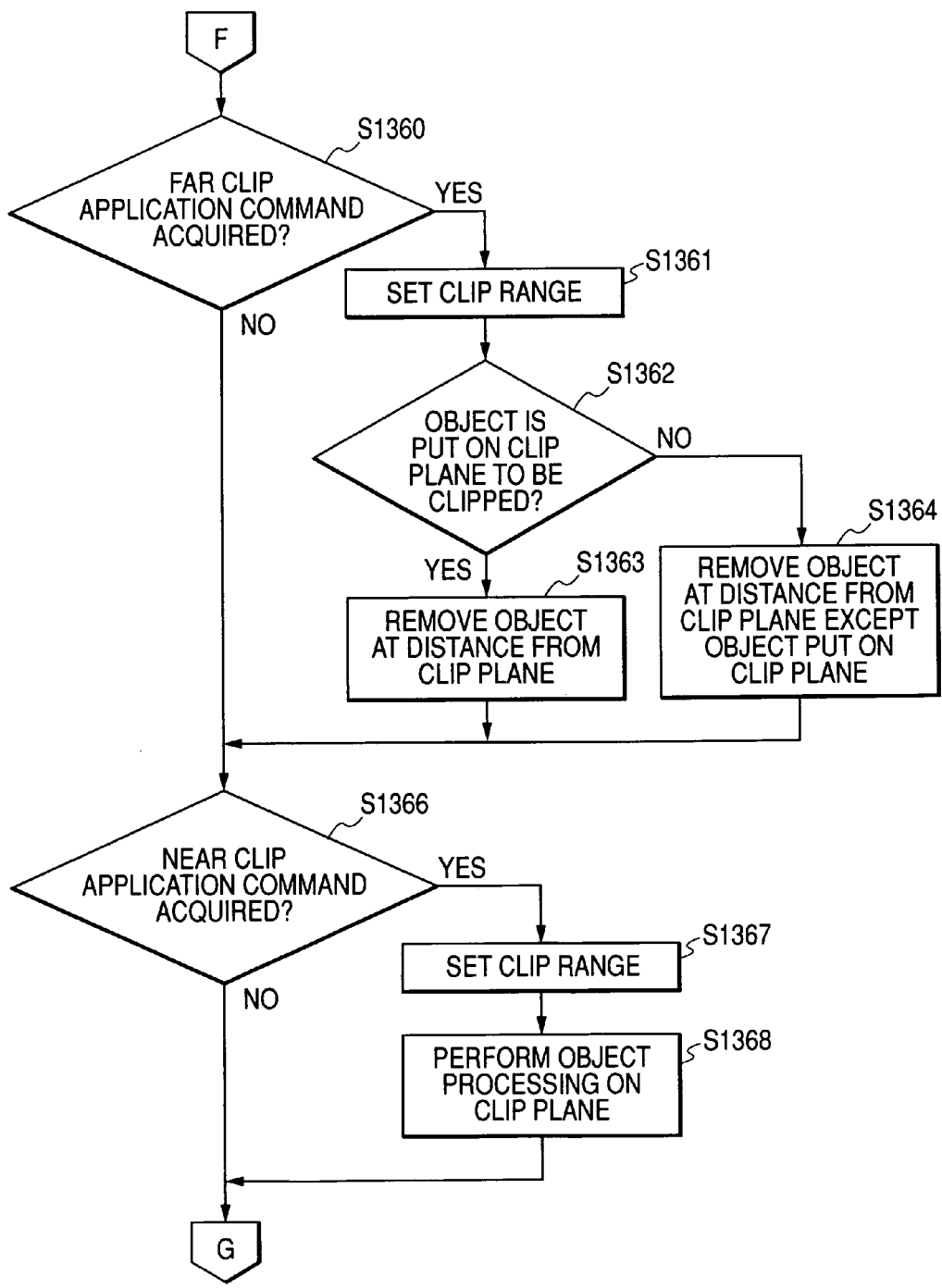
FIG. 35 is a flowchart to show processing following the processing shown in FIG. 31.

FIG. 35 is a flowchart to show processing following the processing shown in FIG. 31. If the condition modification command acquisition unit 100 acquires a far clip application command (YES at step S1360), the process proceeds to step S1361. If the user selects clipping application in the clipping setting screen shown in FIG. 13, the condition modification command acquisition unit 100 acquires the user-entered far clip application command.

Steps S1361 to S1364 are similar to steps S303 to S306 previously described with reference to FIG. 34.

Thus, object placed at the far-side display limit position or at a position distant from the peripheral position in addition to the background board can also be clipped.

As the described operation is performed, the two-dimensional background board 36 with the object 35 drawn thereon as shown in FIG. 33 can be generated. Further, a multi-viewpoint image including the background board 36 and the objects 34*a* and 34*b* drawn three-dimensionally are acquired by the camera array. The multi-viewpoint image thus obtained is reproduced on the three-dimensional image display device, whereby the objects 34*a* and 34*b* are displayed correctly and further the object is displayed in the background although it is flat; display with high image quality is made possible.

Preferably, the background board plane or the clipping plane is displayed as a plane in the model space together with the boundary box in the generation screen displayed on the two-dimensional image display panel 21 so that the user can recognize the position of the background board relative to object or the relative position of the plane of clipping by intuition.

Next, the process proceeds to step S1366 and if the condition modification command acquisition unit 100 acquires a near clip application command (YES at step S1366), the clip range is determined (step S1367). Next, object processing on the clip plane is performed (step S1368). Thus, near clipping may be performed for the near-side limit. Preferably, the clipping range is displayed as a plane in the model space on the three-dimensional image display device 20. Accordingly, the clipping state can be figured out by intuition.

If the object put on the near clip plane is simply cut out on the near clip plane, a failure that the inside of the object is seen occurs. Therefore, processing of either completely removing or leaving the object put on the near clip plane is performed.

Figure 36:
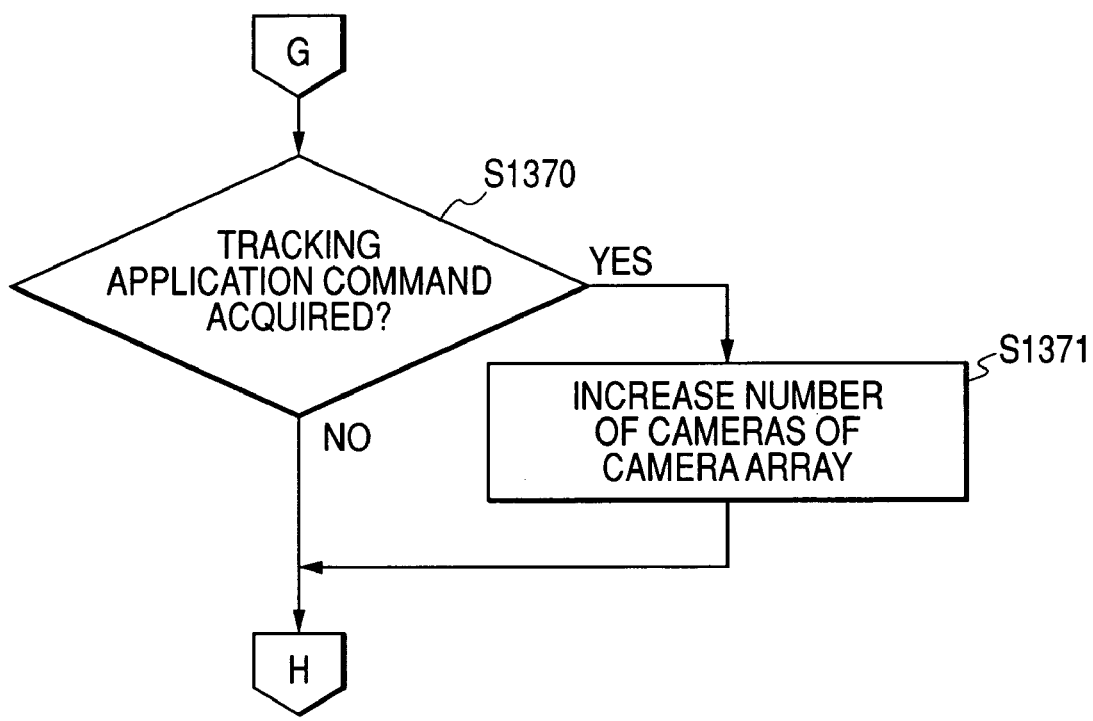
FIG. 36 is a flowchart to show processing following the processing in FIG. 35.

FIG. 36 is a flowchart to show processing following the processing in FIG. 35. If the condition modification command acquisition unit 100 acquires a tracking application command (YES at step S1370), the camera control unit 122 increases the number of cameras of the camera array (step S1371).

Here, the processing of increasing the number of cameras of the camera array (step S1371) will be discussed in detail. In the naked eye type and the spectacle type, the positions where parallax information can be observed are distributed spatially, whereby the observer is allowed to observe a three-dimensional image.

Particularly in the naked eye type, if the configuration of lens array, slits, pinhole array, or the like is adopted, the range in which parallax information can be presented is limited because the number of two-dimensional image display pixels that can be distributed to an exit pupil such as a pinhole or a slit is limited.

The tracking methods are roughly classified into the following two types: Method of acquiring multi-viewpoint image information from the observation direction in real time and presenting the information as parallax information in the observation direction and method of providing all parallax information in the tracking area (range in which the position of the observer is detected) so as to deal with tracking.

In the embodiment, an interface compatible with the latter method is implemented. That is, the viewing zone when tracking is applied rather than the viewing zone based on the emergence angle (θ) is preset. The camera array is arranged so as to provide multiple viewpoint images to realize the observation range. That is, the tracking parameter is determined, whereby a larger number of cameras than the number of cameras determined by the specifications of the three-dimensional image display device for displaying the generated multi-viewpoint image are set automatically. For example, if the viewing zone widens to the double range because of tracking, the number of cameras may be increased by the number of parallaxes.

Figure 37:
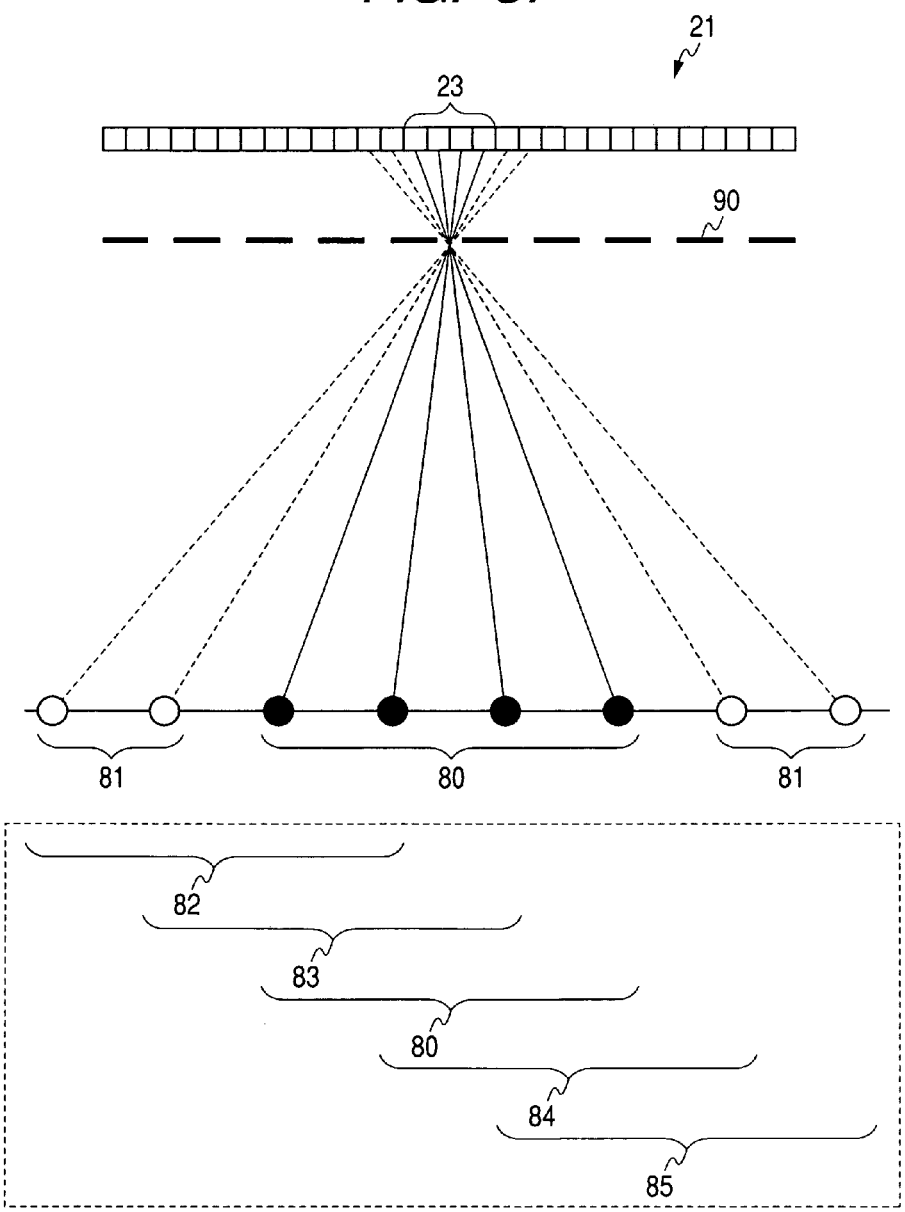
FIG. 37 is a horizontal sectional view to show camera array arrangement (placement positions) 80 when tracking is not applied and camera array arrangement (placement positions) 81 with the number of cameras increased considering the tracking.

FIG. 37 is a horizontal sectional view to show camera array arrangement (placement positions) 80 when tracking is not applied and camera array arrangement (placement positions) 81 with the number of cameras increased considering the tracking. For simplicity, light ray control elements 90 are indicated by slits. Pixels 23 of the two-dimensional image display panel 21 forming a part of the three-dimensional image display device 20 are distributed for each exit pupil. The cameras are placed in the arrangement (placement positions) 80 in response to the positions of the pixels 23.

The pixels 23 of the two-dimensional image display panel 21 corresponding to the exit pupils are again assigned by tracking, and the number of the cameras of the camera array is increased from four cameras placed in the arrangement (placement positions) 80 to eight cameras containing four cameras placed in the arrangement (placement positions) 81.

Accordingly, viewing zones 82 to 85 are switched in response to the position of the observer, whereby the area in which the three-dimensional image can be observed can be widened.

As described above, if the position of the observer is detected by some means and parallax information in the direction is presented (tracking is performed), the area in which the three-dimensional image can be observed can be widened. Magnetic field detection, ultrasonic detection, or image detection is adopted as the method of detecting the position of the observer.

Figure 38:
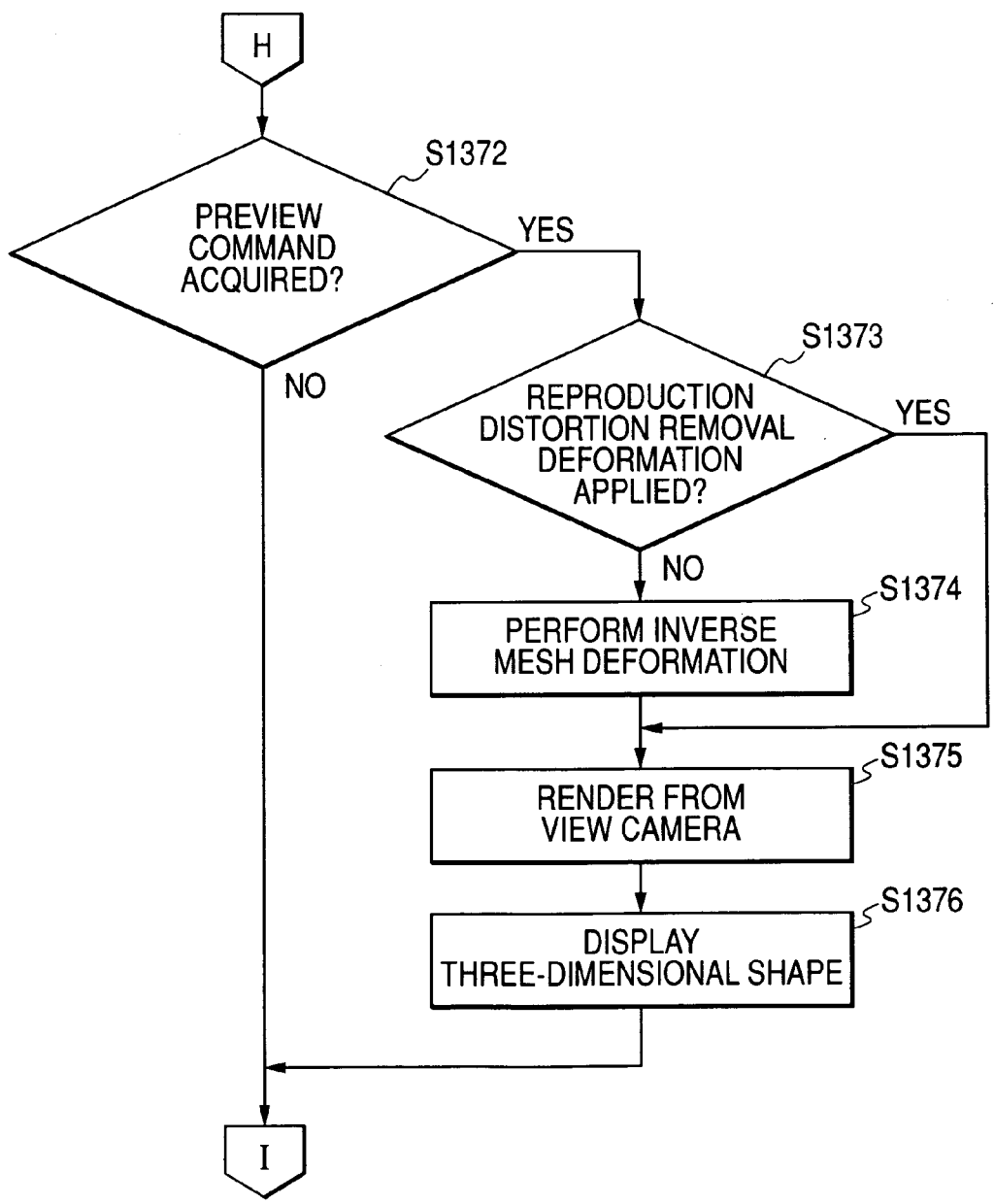
FIG. 38 is a flowchart to show processing following the processing in FIG. 36.

FIG. 38 is a flowchart to show processing following the processing in FIG. 36. If the condition modification command acquisition unit 100 acquires a preview command (YES at step S1372), preview processing (steps S1373 to S1375) is performed.

Specifically, if reproduce distortion removal processing, namely, mesh deformation (step S1343) is conducted (YES at step S1373), the preview screen generation unit 126 renders object. On the other hand, if distortion removal processing is not conducted (NO at step S1373), inverse mesh processing is performed (step S1374).

That is, to capture in parallel projection, inverse deformation to the deformation in FIG. 28 is applied; to capture in perspective projection, inverse deformation to the deformation in FIG. 30 is applied. Accordingly, image distortion produced by skipping horizontal parallel vertical projection of each viewpoint image can be reproduced. Then, rendering is performed from the view camera placed at the observation reference position (step S1375). Next, the preview screen display unit 128 uses the rendering result to display the image of the three-dimensional shape of the object 30 on the two-dimensional image display 12 (step S1376).

Thus, the three-dimensional image at the reproduce time can be displayed as a preview, so that the user can directly check the three-dimensional image at the reproduce time before generating a multi-viewpoint image.

More specifically, an image acquired as perspective projection from the view camera at the position of the viewing distance (L) in the direction of the camera center vector is generated. Accordingly, the observation state with a single eye from the viewing distance (L) can be displayed on the three-dimensional image display device 20. To generate the image, only the object may be displayed, but the horizontal section 41 corresponding to the display surface and the boundary box 40 may be further displayed.

As previously mentioned, the view camera for preview is determined by the viewing distance (L). If the camera distance is modified at step S1341 by perspective degree conversion, the view camera is determined by the distance before the modification, namely, the viewing distance (L)

Figure 39:
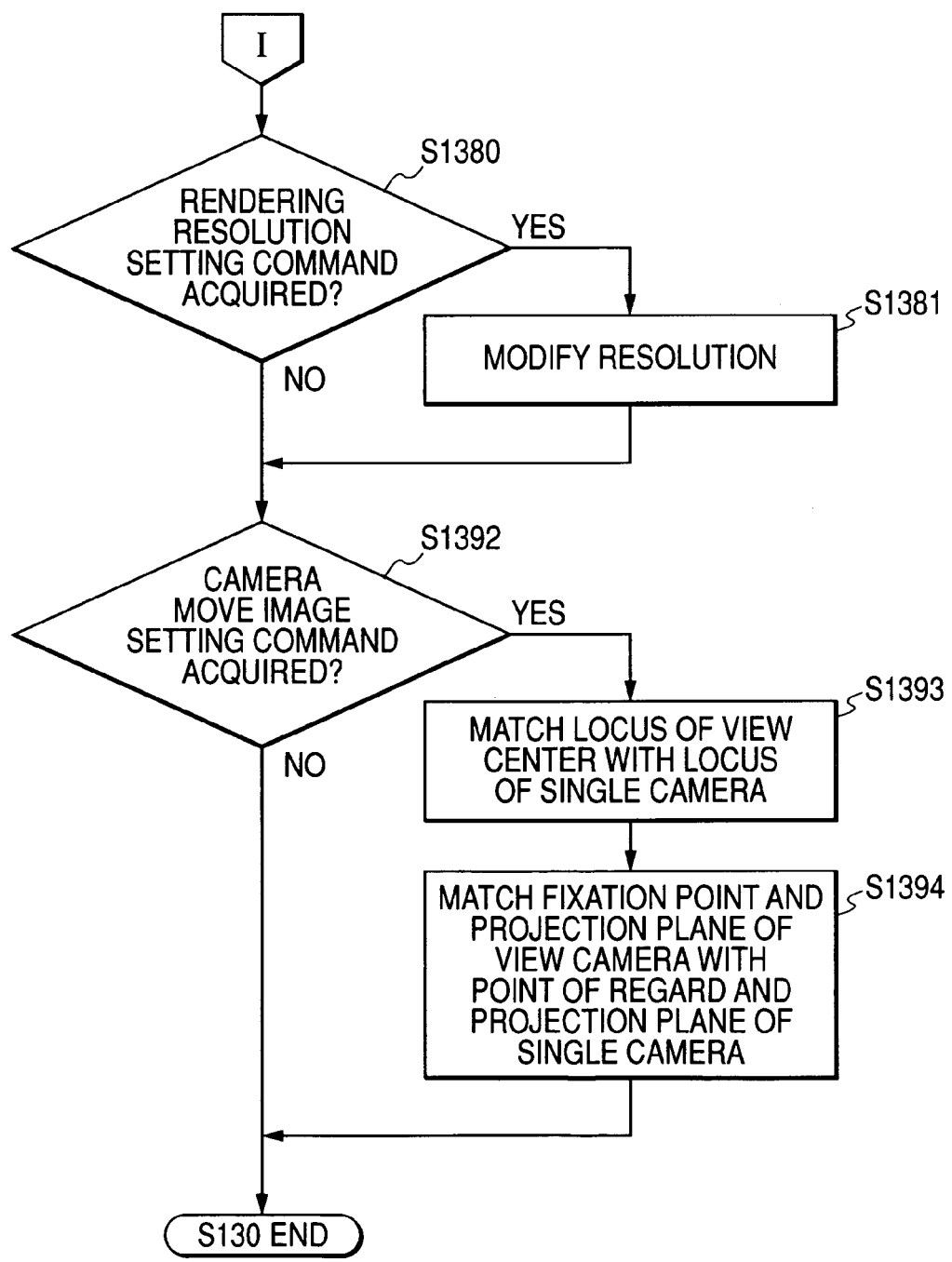
FIG. 39 is a flowchart to show processing following the processing in FIG. 38.

FIG. 39 is a flowchart to show processing following the processing in FIG. 38. If the condition modification command acquisition unit 100 acquires a rendering resolution setting command indicating setting of the resolution of the multi-viewpoint image generated by rendering (YES at step S1380), the multi-viewpoint image generation unit 132 modifies the resolution of the multi-viewpoint image to be generated (step S1381).

Various models of three-dimensional image display devices exist. Therefore, to consider the load when a multi-viewpoint image is acquired, it is desirable that each viewpoint image should be acquired with a considerably high resolution, because the image can be archived for use with a plurality of three-dimensional image display devices.

On the other hand, if the three-dimensional image display device using the acquired image is determined, it is considered that the image may be in the necessary minimum resolution. However, the resolution of each viewpoint image may be set to two to several times the resolution of the three-dimensional image display device and resampling using a complementation filter may be performed. Accordingly, the image quality when a three-dimensional image is displayed can be improved.

Such a three-dimensional image display device for giving parallax information only in the horizontal direction can use the resolution of the used two-dimensional image display as the resolution in the longitudinal direction. Therefore, often the aspect ratio of the resolution of each viewpoint image is not 1.

As described above, it is desirable that the resolution of each viewpoint image should be able to be modified in view of various conditions.

Next, the process proceeds to step S1392. If the condition modification command acquisition unit 100 acquires a camera move image setting command (YES at step S1392), the process proceeds to step S1393. The camera move image setting command is a command for generating an image with the camera moved as the object is. In existing CG model animation, an image captured when the camera is moved with the object intact may be generated. Intervention means of the boundary box 40 is also applied to such object.

Specifically, the camera control unit 122 first matches the locus of the view camera with the locus of a single camera moved with the object intact (step S1393). Further, the projection plane containing the point of regard of the camera array 50 is matched with the projection plane containing the point of regard of the single camera (step S1394).

The modification processing (step S130) is now complete and camera array rendering is executed (step S140). The boundary box and the clip plane are not rendered in the process.

Figure 40:
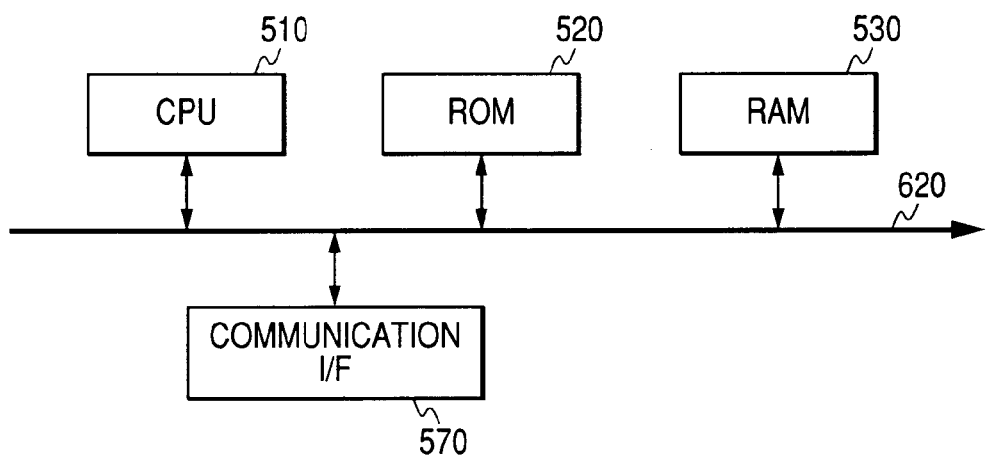
FIG. 40 is a diagram to show the hardware configuration of the multi-viewpoint image generation interface 10 according to the embodiment.

FIG. 40 is a diagram to show the hardware configuration of the multi-viewpoint image generation interface 10 according to the embodiment. The multi-viewpoint image generation interface 10 is implemented as the hardware configuration, and includes ROM 520 for storing the multi-viewpoint image generation program for executing multi-viewpoint image generation processing in the multi-viewpoint image generation interface 10 and the like, a CPU 510 for controlling the sections of the multi-viewpoint image generation interface 10 in accordance with the program in the ROM 520, RAM 530 for storing various pieces of data required for controlling the multi-viewpoint image generation interface 10, a communication I/F 570 connected to a network for conducting communications, and a bus 620, for connecting the sections.

The multi-viewpoint image generation program in the multi-viewpoint image generation interface 10 described above may be provided as it is captured on a computer-readable recording medium such as a CD-ROM, a floppy (R) disk (FD), or a DVD as a file in an installable format or an executable format.

In this case, the multi-viewpoint image generation program is loaded into main memory as it is read from the recording medium and is executed in the multi-viewpoint image generation interface 10, and the sections described in the software configuration are generated in the main memory.

The multi-viewpoint image generation program of the embodiment may be stored in a computer connected to a network such as the Internet and then be provided as the program is downloaded through the network.

Although the invention has been described with the specific embodiment, various modifies, modifications, and improvements of the embodiment can be made.

A first modified example is as follows: The multi-viewpoint image generation interface 10 according to the embodiment displays the generation screen containing the object and the boundary box as the image indicating an arrangement (placement state) of the object on the three-dimensional image display device screen, but the image may be an image for enabling the user to figure out the object arrangement on the three-dimensional image display device screen by intuition and from this viewpoint, is not limited to the boundary box. For example, a mesh may be displayed in place of the boundary box. Both the object and the mesh are displayed, whereby the user can image the object arrangement on the three-dimensional image display device screen.

A second modified example is as follows: In the multi-viewpoint image generation interface 10 according to the embodiment, for example, if a command of processing requiring modification of the shape of the boundary box such as a boundary box shape modification command is acquired, first the shape of the boundary box is modified and the cameras are again arranged in response to the modification. However, the invention is not limited to the mode; first the cameras may be again arranged and the shape of the boundary box may be modified in response to the arrangement.

As described above in detail, according to the multi-viewpoint image generation apparatus, the generation screen display unit displays the image indicating the arrangement of the object on the three-dimensional image display device screen on a two-dimensional image display screen when the multi-viewpoint image is generated, the modification command acquisition unit acquires the modification command of the arrangement of the object in the image displayed by the generation screen display unit according to the user's command, the camera control unit modifies at least one of the number of cameras corresponding to the multi-viewpoint image, the placement position of each of the cameras, the size of the projection plane of each of the cameras, a point of regard, and a projection method based on the modification command, and a multi-viewpoint image acquired by the cameras configured according to the modified camera condition is generated. Accordingly, the user can obtain a multi-viewpoint image to reproduce any desired three-dimensional image by performing intuitional operation without understanding the behavior of the camera array.

The foregoing description of the embodiment has been presented for purposes of illustration and description. It is not intended to be exhaustive or to limit the invention to the precise form disclosed, and modifications and variations are possible in light of the above teachings or may be acquired from practice of the invention. The embodiment is chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. A multi-viewpoint image generation apparatus for generating a multi-viewpoint image for displaying an object on a three-dimensional image display device, the apparatus comprising:
   a generation screen display unit that controls a two-dimensional image display device to display a two-dimensional image indicating an arrangement of the object in a three-dimensional image displayed on a the three-dimensional image display device;
   a modification command acquisition unit that acquires a modification command for modifying an arrangement of the object in the two-dimensional image;
   a camera control unit that modifies a camera condition including a number of cameras corresponding to the multi-viewpoint image, a placement position of each of the cameras, a size of the projection plane of each of the cameras, a point of regard, and a projection method, based on the modification command acquired by the modification command acquisition unit; and
   a multi-viewpoint image generation unit that generates the multi-viewpoint image acquired by the cameras being configured according to the camera condition modified by the camera control unit.

2. The apparatus according to claim 1, wherein the camera control unit modifies a distance from the point of regard to the camera as the placement position of the camera.

3. The apparatus according to claim 1, wherein the camera control unit modifies the interval between the cameras as the placement position of the camera.

4. The apparatus according to claim 1, wherein the generation screen display unit controls the two-dimensional image display device to display the object and a boundary box indicating a three-dimensionally displayable area on the three-dimensional image display device as the two-dimensional image,
   wherein the modification command acquisition unit acquires the modification command for modifying a relative arrangement of the object and the boundary box, and
   wherein the camera control unit modifies the camera condition further including a size and a number of the point of regard and the projection plane, based on the modification command acquired by the modification command acquisition unit.

5. The apparatus according to claim 4, wherein the generation screen display unit controls the two-dimensional image display devce to display the object and the boundary box placed in the relative arrangement indicated in the modification command, when the modification command acquisition unit acquires the modification command.

6. The apparatus according to claim 5, further comprising a boundary box processing unit that modifies the arrangement of the boundary box based on the position of the object displayed on the two-dimensional image display device based on the modification command when the modification command acquisition unit acquires the modification command, wherein the generation screen display unit controls the two-dimensional image display device to display the object and the boundary box in the arrangement modified by the boundary box processing unit.

7. The apparatus according to claim 1, further comprising a preview screen display unit that controls the two-dimensional image display device to display an image of the object captured as perspective projection from a view camera placed at an observation reference position assumed to be a position of an observer and directed to the point of regard.

8. The apparatus according to claim 4, wherein the boundary box has the display limit in a near-side direction of the three-dimensional image display device and the display limit in a far-side direction as boundary surfaces.

9. The apparatus according to claim 4, wherein the boundary box includes the point of regard.

10. The apparatus according to claim 4, wherein the boundary box has boundary surfaces of capturing ranges of two cameras placed at both ends of the cameras.

11. The apparatus according to claim 4, wherein the modification command acquisition unit acquires a shape modification command for modifying a shape of the object to be displayed on the three-dimensional image display device, and
wherein the camera control unit modifies at least one of the size of the projection plane and the placement position of each of the cameras, based on the shape of the object indicated in the shape modification command.

12. The apparatus according to claim 4, wherein the modification command acquisition unit acquires a placement position modification command for modifying a placement position of the object, and
wherein the camera control unit translates both of the point of regard and the placement position of each of the cameras, based on the placement position of the object indicated in the placement position modification command.

13. The apparatus according to claim 4, wherein the modification command acquisition unit acquires a placement angle modification command for modifying a placement angle of the object relative to a screen of the three-dimensional image display device, and
wherein the camera control unit rotates each of the cameras with the point of regard included in the boundary box as the reference, based on the rotation angle indicated in the placement angle modification command.

14. The apparatus according to claim 4, wherein the generation screen display unit controls the two-dimensional image display device to display the two-dimensional image including a camera center vector that indicates a direction of a center position of the placement positions of the cameras,
wherein the modification command acquisition unit acquires a camera center vector modification command for modifying the direction of the camera center vector, and
wherein the camera control unit modifies the placement position of each of the cameras based on the direction of the camera center vector indicated in the camera center vector modification command, while maintaining the point of regard.

15. The apparatus according to claim 4, wherein the modification command acquisition unit acquires a screen size modification command for modifying a screen size of the three-dimensional image display device, and
wherein the camera control unit modifies the size of the projection plane of each of the cameras based on the screen size indicated in the screen size modification command acquired by the modification command acquisition unit.

16. The apparatus according to claim 4, wherein the modification command acquisition unit acquires a display system modification command for modifying a display system of the three-dimensional image display device, and
wherein the camera control unit modifies at least one of the number of cameras, the placement position of each of the cameras, the point of regard, and the projection method, based on the display system indicated in the display system modification command acquired by the modification command acquisition unit.

17. The apparatus according to claim 4, wherein the modification command acquisition unit acquires a projection method modification command for modifying the projection method, and
wherein the camera control unit modifies at least one of the projection method of each of the cameras, the placement position, the size of the projection plane, and the point of regard, based on the projection method indicated in the projection method modification command acquired by the modification command acquisition unit.

18. The apparatus according to claim 4, wherein the modification command acquisition unit acquires an object spatial frequency modification command for modifying a spatial frequency used for drawing the two-dimensional image, and
wherein the camera control unit modifies the two-dimensional image based on the spatial frequency indicated in the object spatial frequency modification command acquired by the modification command acquisition unit.

19. The apparatus according to claim 4, wherein the modification command acquisition unit acquires an observation reference viewing distance modification command for modifying an observation reference viewing distance between the object and an observation reference position of the three-dimensional image, and
wherein the camera control unit modifies at least one of the number of cameras and the placement position of each of the cameras, based on the observation reference viewing distance indicated in the observation reference viewing distance modification command acquired by the modification command acquisition unit.

20. The apparatus according to claim 4, wherein the modification command acquisition unit acquires a perspective degree modification command for modifying a perspective degree in the three-dimensional image, and
wherein the camera control unit modifies the placement position of each of the cameras, based on the perspective degree indicated in the perspective degree modification command acquired by the modification command acquisition unit.

21. The apparatus according to claim 4, further comprising:
a reproduce distortion removal application command acquisition unit that acquires a reproduce distortion removal application command for performing removal processing of reproduce distortion to be occurred in the three-dimensional image; and
a mesh deformation unit that performs mesh deformation of the object when the reproduce distortion removal application command acquisition unit acquires the reproduce distortion removal application command,
wherein the multi-viewpoint image generation unit generates the multi-viewpoint image of the object being subjected to the mesh deformation by the mesh deformation unit.

22. The apparatus according to claim 21, wherein the generation screen display unit controls the two-dimensional image display device to display the two-dimensional image indicating the arrangement of the object, before being subjected to the mesh deformation, in the multi-viewpoint image, when the reproduce distortion removal application command acquisition unit acquires the reproduce distortion removal application command.

23. The apparatus according to claim 21, further comprising:
an inverse mesh deformation unit that performs inverse mesh deformation of inverse processing to the mesh deformation for the object deformed by the mesh deformation unit; and
a preview image display unit that controls the two-dimensional image display device to display a three-dimensional shape image of the object after subjected to the inverse mesh deformation by the inverse mesh deformation unit, the object captured as perspective projection from a view camera placed at the observation reference position that is assumed to be a position of an observer and directed to the point of regard on the two-dimensional image display screen, when the object is subjected to the mesh deformation.

24. The apparatus according to claim 1, further comprising a camera resolution modification command acquisition unit that acquires a camera resolution modification command for modifying a resolution of the camera,
wherein the multi-viewpoint image generation unit generates the multi-viewpoint image in the camera resolution indicated in the camera resolution modification command acquired by the camera resolution modification command acquisition unit.

25. The apparatus according to claim 1, further comprising a camera move three-dimensional image generation command acquisition unit that acquires a camera move three-dimensional image generation command for generating a camera move three-dimensional image being captured while the camera is moved relative to the object,
wherein the camera control unit matches a locus of a view camera placed at an observer reference position of three-dimensional image display device with a locus of the move camera for capturing the camera move three-dimensional image, and matches the point of regard and the projection plane of the cameras with the point of regard and the projection plane of the move camera, when the camera move three-dimensional image generation command acquisition unit acquires the camera move three-dimensional image generation command.

26. The apparatus according to claim 4, further comprising:
a background board installation command acquisition unit that acquires a background board installation command for installing a background board in a far-side direction of the multi-viewpoint image; and
a background board handling unit that installs the background board when the background board installation command acquisition unit acquires the background board installation command,
wherein the generation screen display unit controls the two-dimensional image display device to display the background board installed by the background board handling unit.

27. The apparatus according to claim 1, further comprising a clipping command acquisition unit that acquires a clipping command for performing a clipping processing in a far-side direction or a near-side direction in a screen of the three-dimensional image display device,
wherein the generation screen display unit controls the two-dimensional image display device to display the clipping position indicated in the clipping command acquired by the clipping command acquisition unit.

28. The apparatus according to claim 27, wherein the camera control unit matches the projection plane and the clipping plane of the cameras with a screen and a clipping plane of the three-dimensional image display device, when the clipping command acquisition unit acquires the clipping processing command.

29. A method for generating a multi-viewpoint image for displaying an object on a three-dimensional image display device, the method comprising:
controlling a two-dimensional image display device to display a two-dimensional image indicating an arrangement of the object in the multi-viewpoint image to be displayed on the three-dimensional image display device;
acquiring a modification command for modifying an arrangement of the object in the two-dimensional image;
modifying a camera condition including a number of cameras corresponding to the multi-viewpoint image, a placement position of each of the cameras, a size of the projection plane of each of the cameras, a point of regard, and a projection method, based on the acquired modification command; and
generating the multi-viewpoint image acquired by the cameras being configured according to the modified camera condition.

30. A computer-readable program product for causing a computer to generating a multi-viewpoint image for displaying an object on a three-dimensional image display device, the program product causing the computer to perform procedures comprising:
controlling a two-dimensional image display device to display a two-dimensional image indicating an arrangement of the object in the multi-viewpoint image to be displayed on the three-dimensional image display device;
acquiring a modification command for modifying an arrangement of the object in the two-dimensional image;
modifying a camera condition including a number of cameras corresponding to the multi-viewpoint image, a placement position of each of the cameras, a size of the projection plane of each of the cameras, a point of regard, and a projection method, based on the acquired modification command; and
generating the multi-viewpoint image acquired by the cameras being configured according to the modified camera condition.

* * * * *